United States Patent
Chavva

(10) Patent No.: US 9,852,257 B1
(45) Date of Patent: Dec. 26, 2017

(54) METHOD AND SYSTEM FOR DESIGNING A SEMICONDUCTOR CHIP BASED ON GROUPING OF HIERARCHIAL PINS THAT PERMIT COMMUNICATION BETWEEN INTERNAL COMPONENTS OF THE SEMICONDUCTOR CHIP

(71) Applicant: Marvell International Ltd., Hamilton (BM)

(72) Inventor: Atchi Reddy Chavva, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 185 days.

(21) Appl. No.: 14/692,561

(22) Filed: Apr. 21, 2015

Related U.S. Application Data

(60) Provisional application No. 61/982,118, filed on Apr. 21, 2014.

(51) Int. Cl.
*G06F 17/50* (2006.01)

(52) U.S. Cl.
CPC ............................... *G06F 17/5077* (2013.01)

(58) Field of Classification Search
USPC .......................................................... 716/131
See application file for complete search history.

(56) References Cited

U.S. PATENT DOCUMENTS

| | | | |
|---|---|---|---|
| 2008/0201679 A1* | 8/2008 | Oka ................... | G06F 17/5045 716/119 |
| 2009/0125861 A1* | 5/2009 | Orita ................... | G06F 17/5077 716/137 |

* cited by examiner

*Primary Examiner* — Bryce Aisaka

(57) ABSTRACT

Embodiments include a computer implemented method comprising: while designing a chip, identifying a plurality of partitions in the chip, for a first partition of the plurality of partitions in the chip, identifying a plurality of pins configured to interconnect the first partition with one or more other partitions of the plurality of partitions of the chip, assigning a name to each of the plurality of pins associated with the first partition of the plurality of partitions, based on the names assigned to each of the plurality of pins, forming a plurality of groups such that each group of the plurality of groups is associated with a corresponding one or more pins of the plurality of pins, and based on forming the plurality of groups, designing a first subset of the plurality of pins to be located at close proximity in the chip.

20 Claims, 16 Drawing Sheets

Pin/Bus names mstr5_wdata[0]
mstr5_wdata[1]
mstr5_wid[0]
mstr5_wid[1]
mstr5_rresp[0]
mstr5_rresp[1]
mstr6_rresp[0]
mstr6_rresp[1]
mstr6_wdata[0]
mstr6_wdata[1]
mstr7_rresp[0]
mstr7_rresp[1]
mstr7_wdata[0]
mstr7_wdata[1]
rDataCxbar[0]
rDataCxbar[1]
rIdCxbar[0]
rIdCxbar[1]
aRReadyCxbar
aRValidCxbar
bscanCLOCK_DR
bscanHIGHZ
bscanInCPUSS
droClkOut_fm_cpuSS
droClkOut_to_cpuSS
droEnOut_fm_cpuSS
droEnOut_to_cpuSS
edtLPShiftEn
iTCK
iTRSTn
iTestMode
iUpdateDR
mstr4_arready
mstr4_awvalid
mstr5_wvalid
mstr6_wready
mstr7_wready
ntrst
padRstn
socDdrSyncRstn
sysRstn
testPllBypass

Fig. 7

METHOD AND SYSTEM FOR DESIGNING A SEMICONDUCTOR CHIP BASED ON GROUPING OF HIERARCHIAL PINS THAT PERMIT COMMUNICATION BETWEEN INTERNAL COMPONENTS OF THE SEMICONDUCTOR CHIP

CROSS REFERENCE TO RELATED APPLICATIONS

This claims priority to U.S. Provisional Patent Application No. 61/982,118, filed on Apr. 21, 2014, which is incorporated herein by reference in its entirety.

TECHNICAL FIELD

Embodiments of the present disclosure relate to circuit design, and in particular to circuit design based on a grouping of hierarchical pins that permit communication between internal components and partitions of a chip.

BACKGROUND

Designing a complex semiconductor chip (referred to herein generally as "chip") is usually a time consuming process, and requires several iterations. For example, a chip usually has thousands of internal pins for communication between various internal components and partitions of the chip. During a first iteration of the design of the chip, the pins, for example, are designed to be placed at specific locations in the chip. However, subsequent modification in the design of the chip typically necessitates a re-design in the placement of the pins. Such iterations in the design of the chip are labor intensive and time consuming.

SUMMARY

In various embodiments, the present disclosure provides a computer implemented method comprising: while designing a chip, identifying a plurality of partitions in the chip, for a first partition of the plurality of partitions in the chip, identifying a plurality of pins configured to interconnect the first partition with one or more other partitions of the plurality of partitions of the chip, assigning a name to each of the plurality of pins associated with the first partition of the plurality of partitions, based on the names assigned to each of the plurality of pins, forming a plurality of groups such that each group of the plurality of groups is associated with a corresponding one or more pins of the plurality of pins, and based on forming the plurality of groups, designing a first subset of the plurality of pins to be located at close proximity in the chip.

In various embodiments, the present disclosure also provides an apparatus for designing a chip, the apparatus comprising: one or more processors; and a non-transitory computer-readable storage media, wherein instructions are tangibly stored on the computer-readable storage media, wherein the instructions are executable by the one or more processors to enable the one or more processors to design a chip by identifying a plurality of partitions in the chip, for a first partition of the plurality of partitions in the chip, identifying a plurality of pins configured to interconnect the first partition with one or more other partitions of the plurality of partitions of the chip, assigning a name to each of the plurality of pins associated with the first partition of the plurality of partitions, based on the names assigned to each of the plurality of pins, forming a plurality of groups such that each group of the plurality of groups is associated with a corresponding one or more pins of the plurality of pins, and based on forming the plurality of groups, designing a first subset of the plurality of pins to be located at close proximity in the chip.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

FIG. 7 lists a plurality of pins of a semiconductor chip.

DETAILED DESCRIPTION

Figure 1:
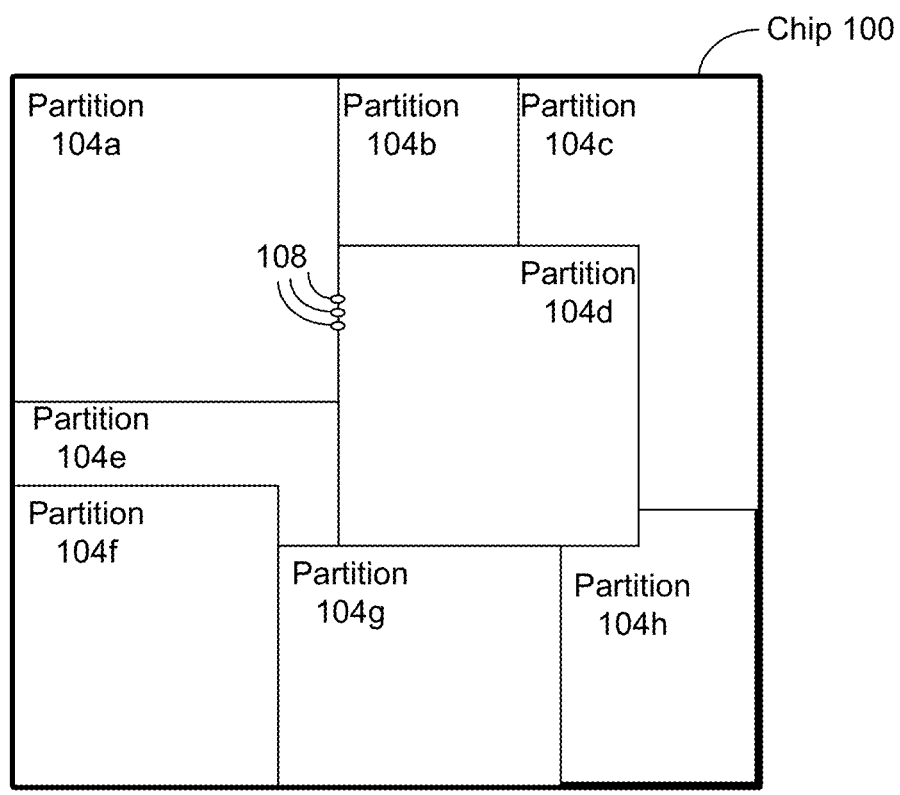
FIG. 1 schematically illustrates a semiconductor chip divided in a plurality of partitions.

FIG. 1 schematically illustrates a semiconductor chip 100 (henceforth referred to as "chip 100"). The chip 100, for example, comprises a system on a chip (SOC). In an embodiment, the chip 100 is partitioned in a plurality of partitions 104a, . . . , 104h. Although FIG. 1 illustrates a specific number, specific shapes and specific sizes of the partitions, the chip 100 can have any different number, shapes and/or sizes of the partitions.

In an embodiment, the partitions 104a, . . . , 104h partitions or divides the chip 100 in different functional or logical areas. Merely as an example, the partition 104a represents a processing core of the chip 104a, the partition 104b represents a level 1 (L1) cache of the chip, and so on.

In an embodiment, a partition of the chip 100 communicates with one or more other partitions of the chip 100 via a corresponding plurality of pins. Three example pins 108 are illustrated in FIG. 1, which facilitate communication between the partition 104a and the partition 104d. Although only three example pins are illustrated in FIG. 1, the chip 100 can comprise hundreds, and even thousands of such pins. The pins are used for intra-partition communication, e.g., communication between two partitions of the chip 100. A pin is, for example, a connector that communicates signals between two corresponding partitions.

In an example, a pin refers to a single connector, a single wire or a single communication link (e.g., comprising a single bit communication link) that carries signals. In an example, a bus refers to a group of pins. For example, 2 pins can form a bus. A port refers to a group of buses. An Advanced eXtensible Interface (AXI) is an example of a port. An Advanced Microcontroller Bus Architecture (AMBA) High-performance Bus (AHB) is another example of a port. Thus, a group of pins form a bus, and a group of buses form a port. A port of the chip 100 comprises a plurality of pins.

The design of the chip 100 is an iterative and time consuming process. For example, while designing the chip 100, various partitions and the pins associated with the partitions are designed. Any change in the partition design also changes the layout, design and/or number of the pins. Furthermore, the number of pins present in a typical chip usually ranges in thousands, which makes the design and placement of the pins during the designing of the chip 100 even more challenging. As discussed herein later in more detail, to better stream-line the design of the chip, in an embodiment, the pins associated with a specific partition are assigned respective names (e.g., based on the functionality of the pins). The pins are then grouped in two or more pin groups based on the assigned names, and during an iteration of the design, multiple pins are designed to be placed in close proximity in the chip based on the groupings of the pins.

In an embodiment, while designing the chip 100, the pins that are to be included within the chip 100 are assigned respective names. The naming of a pin is, for example, based on a functionality of the pin, a port in which the pin is to be included, a partition with which the pin is to be associated, a partition to which signals via the pin are to be transmitted, a combination of these factors, and/or the like. In an example, standard naming conventions, protocols or rules are followed while naming the pins, and the standard naming conventions, protocols or rules are known to those who are designing the chip 100. For example, the same standard naming conventions, protocols or rules are followed in naming each of the pins (or at least most of the pins) of the chip 100.

For example, assume that the partition 104a communicates with the partition 104e, and in such a communication, the partition 104a is a master and the partition 104e is a slave. Also, assume that the partition 104a is transmitting write data to the partition 104e. Accordingly, a pin in the partition 104a, which transmits write data from the partition 104a to the partition 104e, is named as mstr5_wdata. This implies that the partition 104a is master to the partition 104e, and is transmitting write data to the partition 104e—the number "5" identifies the partition 104e, to which the write data is being transmitted; the phrase "mstr" denotes master; and the phrase "wdata" denotes write data. Thus, the name of the pin mstr5_wdata is based on a functionality of the pin, and also based on a destination of the signal transmitted via the pin.

Two different approaches associated with the grouping of the pins and designing of the chip 100 are presented herein below in this disclosure.

First Approach to Pin Groupings and Designing the Chip 100

Figure 2:
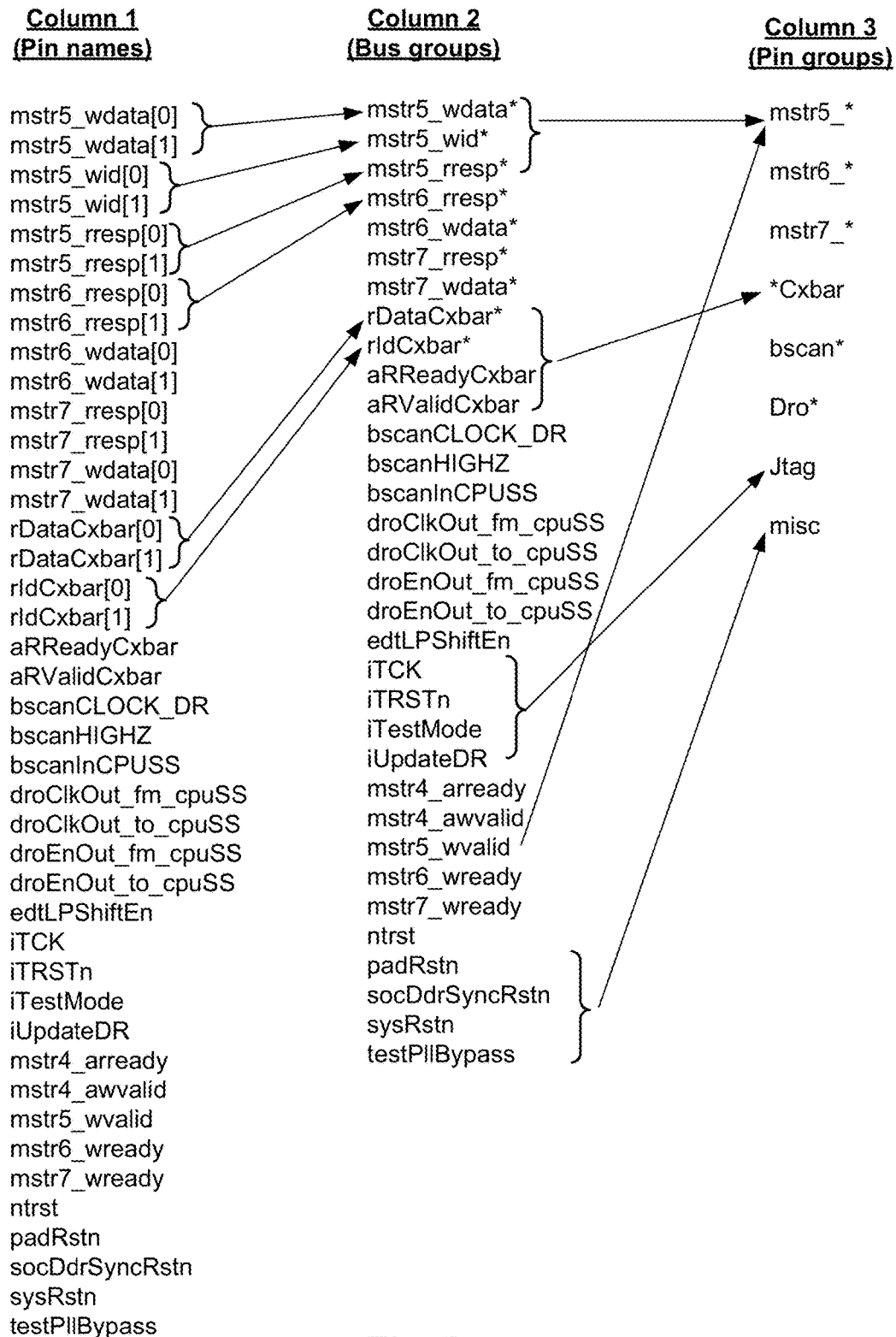
FIG. 2 illustrates an example formation of a group of pins (referred to herein as "pin groups") from a plurality of pins, while designing the semiconductor chip of FIG. 1.

FIG. 2 illustrates formation of pin groups from a plurality of pins, while designing the chip 100. FIG. 2 comprises three columns. The first column in FIG. 2 (labeled as column 1 in FIG. 2) comprises names of pins that are associated with a specific partition of the chip, e.g., the partition 104a.

Although the partition 104a can be associated with hundreds, and perhaps thousands of pins, only some of the pin names are illustrated in the first column of FIG. 2 for purposes of simplicity and to not obscure the inventive principles of this disclosure.

In FIG. 2, some of the pin names include in parenthesis a specific number. For example, the first two pins in the first column are mstr5_wdata[0] and mstr5_wdata[1], implying that a bus mstr5_wdata comprises two signals that are transmitted over the two associated pins.

The second column in FIG. 2 illustrates different bus groups. For example, the pins mstr5_wdata[0] and mstr5_wdata[1] form a bus mstr5_wdata. Accordingly, the first bus in FIG. 2 is mstr5_wdata, which comprises signals from the two associated pins mstr5_wdata[0] and mstr5_wdata[1].

Similarly, for example, the pins mstr5_wid[0] and mstr5_wid[1] form a bus mstr5_wid, as illustrated in FIG. 2.

Some of the buses in the second column comprise a corresponding single pin. For example, the bus aRReadyCxbar in the second column of FIG. 2 comprises a single pin of the same name.

As illustrated in FIG. 2, some of the bus names comprise an asterisk sign ("*") at the end. For example, the bus mstr5_wdata* comprises the asterisk sign at the end. The asterisk sign implies one or more wild characters (e.g., which can be any appropriate characters). Thus, the name of the bus mstr5_wdata* indicates that the bus comprises pins with names that start with "mstr5wdata" and have one or more other characters at the end. Accordingly, the pins mstr5_wdata[0] and mstr5_wdata[1] are included in the bus mstr5_wdata*.

In an embodiment, during a design of the chip 100, subsequent to the formation of the bus groups in the second column, pin groups are formed from the bus groups. For example, a pin group comprises one or more bus groups. The third column of FIG. 2 illustrates the pin groups.

In an embodiment, the pin groups are formed based on prefixes or post-fixes (e.g., suffixes) of the names of the bus groups. For example, bus groups that have similar prefixes (e.g., same starting characters in their respective names) are grouped in a corresponding pin group. In another example, bus groups that have similar post-fixes (e.g., same ending characters in their respective names) are grouped in a corresponding pin group.

For example, the second column comprises bus groups that are named mstr5_wdata*, mstr5_wid* and mstr5_wvalid. As these three bus groups have the same prefix mstr5_, these three bus groups are grouped within a pin group named mstr5_*. The asterisk sign at the end of the pin group mstr5_* indicates that this pin group includes bus groups that start with mstr5_ and have one or more other characters at the end.

In another example, the second column comprises bus groups that are named rDataCxbar*, rIdCxbar*, aRReadyCxbar and aRValidCxbar. As these four bus groups have the same post-fix Cxbar, these four bus groups are grouped within a pin group named *Cxbar. The asterisk sign at the beginning of the pin group Cxbar indicates that this pin group includes bus groups that end with Cxbar and have one or more other characters at the beginning.

In an example, one or more of the pins and bus groups in FIG. 2 (e.g., iTCK, iTRSTn, iTestMode, and iUpdateDR) are associated with testing the corresponding partition. In an embodiment, the bus groups associated with testing are grouped under a pin group named Jtag (Joint Test Action Group), although for example, any other appropriate name (e.g., test pin group, testing, etc.) can also be used instead. Such grouping of the bus groups, in addition to or instead of being based on prefixes and post-fixes of the names, is based on functionality of the pins of the bus groups.

In an example, it is not possible to classify at least some of the bus groups, based on prefixes, post-fixes and/or functionality of the corresponding pins. In an embodiment, such bus groups are included, for example, in a miscellaneous pin group (labeled as "misc" in FIG. 2).

In an example and although not illustrated in FIG. 2, a partition of a chip can have as many as 3600 pins. In an example, these 3600 pins are reduced to 242 bus groups. The 242 bus groups are further reduced to 16 pin groups. Thus, grouping the pins of a partition in pin groups, as illustrated in FIG. 2, significantly reduces a number of components (e.g., pin groups) that are to be considered while designing the chip 100.

Figure 3:
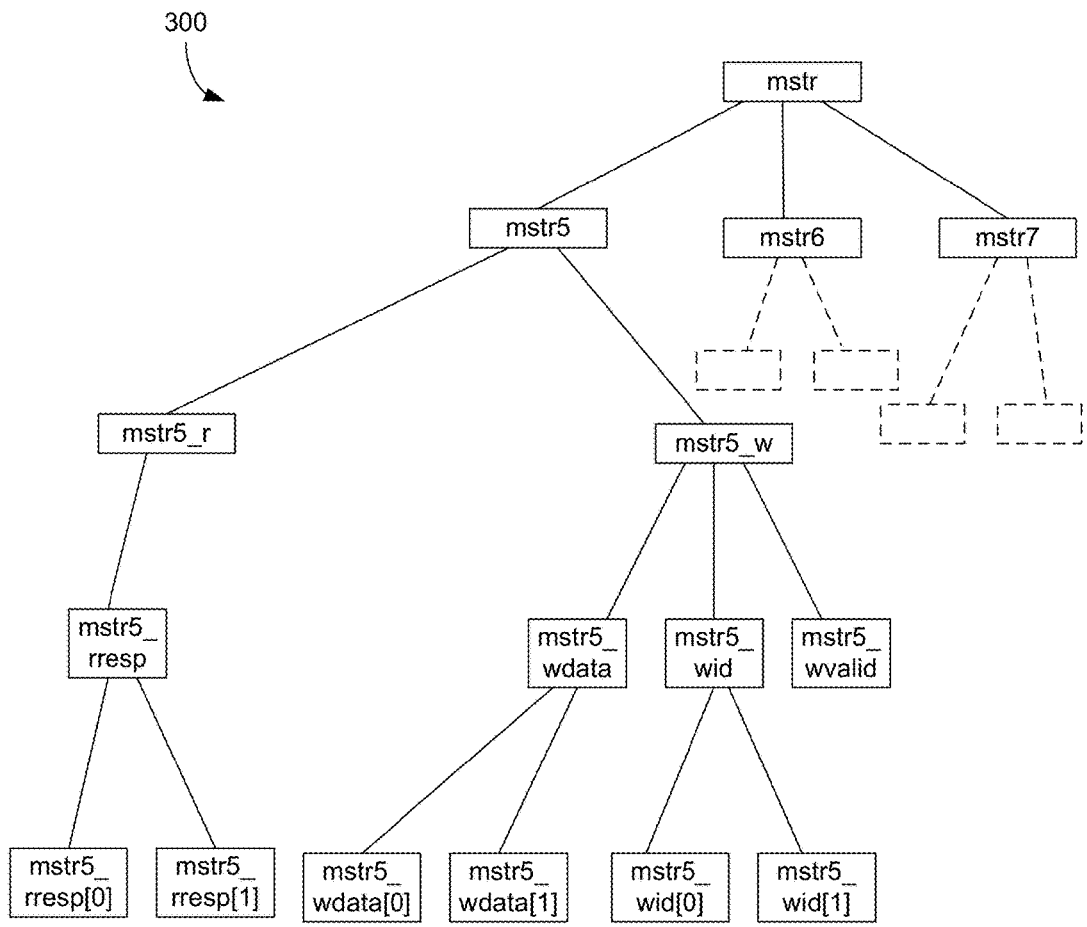
FIG. 3 illustrates an example of a tree structure that is generated based on prefixes of a plurality of pins.

In an embodiment, once the pins are grouped in two or more pin groups, as illustrated in FIG. 2, the pins of one or more pin groups are categorized or arranged in a form of a tree structure. FIG. 3 illustrates an example of a tree 300, based on prefixes of various pins. As the tree 300 is based on prefixes of the corresponding pins, the tree 300 is also referred to as a prefix tree.

In an embodiment, the tree 300 has various nodes placed at various hierarchical levels. A parent node of the tree 300 can have one or more children node. The parent node is assumed to be at a higher level compared to a child node. Some of the nodes of the tree 300 do not have a corresponding child node. The tree 300 is generated from a list of the pins that correspond to a specific partition of the chip 100. As an example, the tree 300 is generated from the list of the pins that correspond to the partition 104a of the chip 100.

The tree 300 of FIG. 3 is based on the pin groups illustrated in FIG. 2. The top level or the highest level of the tree 300 has a node mstr, which has three child nodes—mstr5, mstr6 and mstr7. For example, as illustrated in FIG. 2, the mstr5_*, mstr6_* and mstr7_* are three pin groups, and the tree 300 is based on these three pin groups.

For the sake of simplicity and in order to not obfuscate the teachings of this disclosure, the children (and grandchildren, and subsequent generation) of the nodes mstr6 and mstr7 are not illustrated in FIG. 3. That is, sub-trees underneath the nodes mstr6 and mstr7 are not illustrated in FIG. 3. Only the children (and grandchildren, and subsequent generation) of the node mstr5 (i.e., the sub-tree underneath the node mstr5) are illustrated in FIG. 3.

In an embodiment, the nodes in the tree 300 are arranged in an alphabetical order, e.g., to an extent similar to the manner in which words appear in a dictionary. Referring again to FIG. 2, all the entries associated with mstr5 starts with mstr5_. So, for example, once it is identified that pins with prefix mstr5 actually has mstr5_ as their prefix, potential pins with entries mstr5_a* is checked first in the list of pins, followed by potential pins with entries mstr5_b*, and so on. As illustrated in FIG. 2, there are no pins with names starting with mstr5_a or mstr5_b, and hence, the search continues. Once the design algorithm identifies at least one pin that has mstr5_r as a prefix, the node mstr5_r is included as a child to the node mstr5. Similarly, mstr5_w is also identified as a child node to the node mstr5.

The only bus group that has mstr5_r as a prefix is mstr5_rresp. Accordingly, this bus group is included as a child to the node mstr5_r in the tree 300. The two pins mstr5_rresp[0] and mstr5_rresp[1] are included as being children to the node mstr5_rresp in the tree 300. Similarly, the node mstr5_w is expanded to include associated children and grandchildren in the tree 300.

Although not illustrated in FIG. 3, the nodes mstr6 and mstr7 are also expanded in a similar manner to complete the tree 300.

Figure 4:
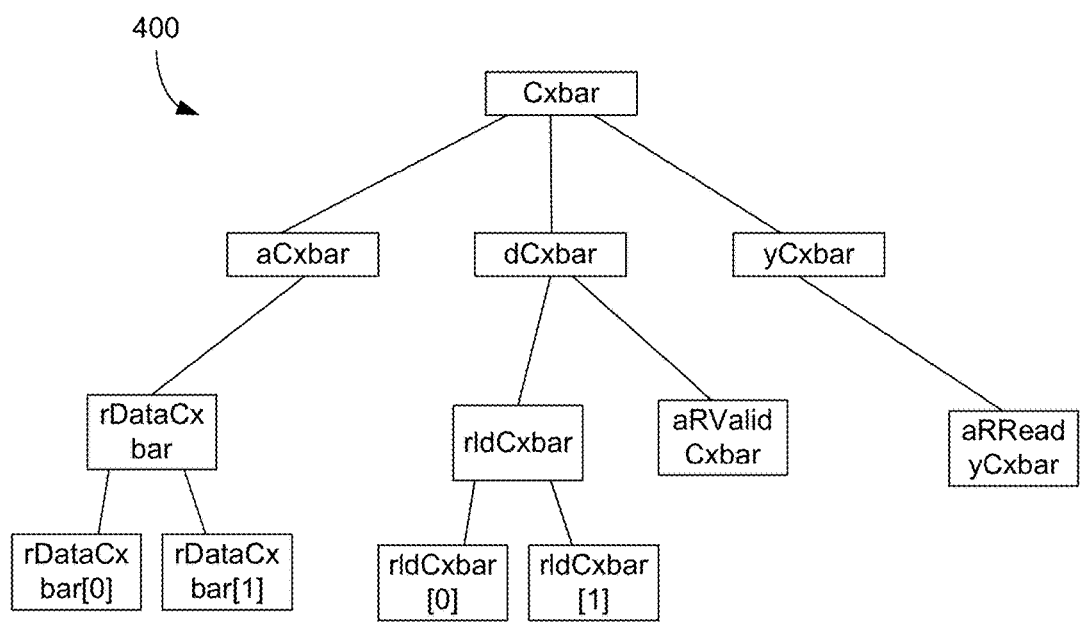
FIG. 4 illustrates an example of a tree structure that is generated based on post-fixes of a plurality of pins.

The tree 300 of FIG. 3 is a prefix tree, as previously discussed herein. In an embodiment, a post-fix tree is generated for the pin group that ends with the post-fix *Cxbar (which is a name of a pin group, as illustrated in FIG. 2). For example, FIG. 4 illustrates an example of a tree 400, based on post-fixes of the pins. The tree of FIG. 4 is generated similar to the generation of the tree 300 of FIG. 3 (although it is to be noted that the tree 300 is based on prefixes of the pin names, while the tree 400 is based on post-fixes of the pin names). Accordingly, a more detailed description of the generation of the tree 400 is omitted herein.

The tree 300 is specific to the pin groups that start with the prefix mstr. As illustrated in FIG. 2, there are other pin groups that start with different prefixes, and a tree is generated for each of these prefixes. For example, referring to FIG. 2, a tree is generated for pins that start with prefix bscan (where bscan* is a name of a pin group), another tree is generated for pins that start with prefix Dro, and so on.

Figure 5:
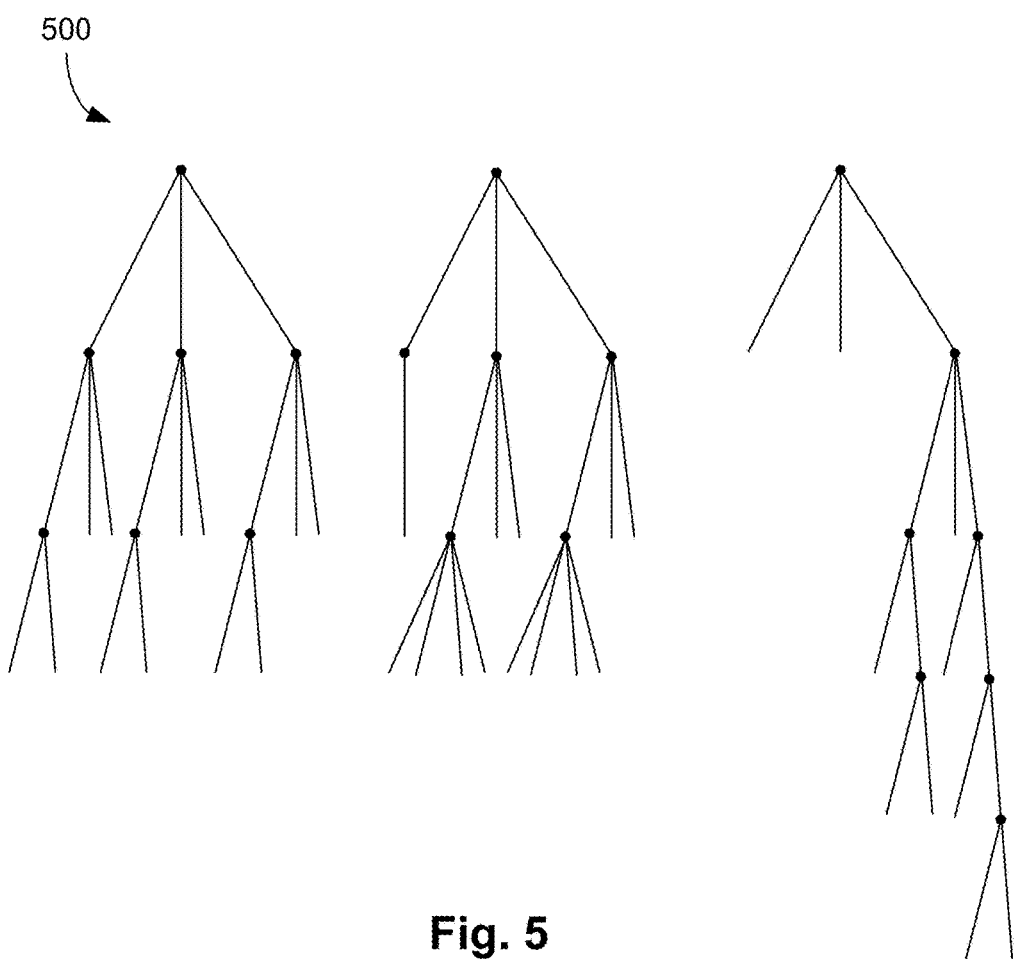
FIG. 5 illustrates an example of a forest comprising a plurality of tree structures.

Thus, a plurality of trees for the pin groups illustrated in FIG. 2 is generated. All the trees associated with a specific partition forms a "forest" for the partition. Thus, a forest associated with a partition includes a plurality of trees, examples of which are illustrated in FIGS. 3 and 4. FIG. 5 is an example of a forest 500 comprising three trees (although the trees illustrated in the forest 500 do not match with the trees 300 and 400 of FIGS. 3 and 4, respectively). The forest 500 is a simplified illustration of a forest, and an actual forest associated with a partition of the chip 100 can be more complex and can include a larger number of trees. The nodes of the trees in the forest 500 are illustrated using black dots.

In a tree, a leaf node refers to a node that does not have a child. For example, in FIG. 3, the nodes mstr5_wvalid and mstr5_rreso[0] does not have any corresponding child node—hence, these nodes are categorized as a leaf node.

Once the trees of a forest associated with a partition of the chip 100 are generated, various nodes of a tree are assigned corresponding node weights. In an embodiment, a node weight is assigned to a node of a tree in accordance with the following:

$$\text{Node weight of a node of a tree} = (\text{number of children in the tree, excluding leaf nodes}) \times$$

$$(\text{number of levels underneath the node in the tree}) \times$$
$$(\text{number of similar sub-trees found in the forest}) \quad \text{Equation 1}$$

For example, consider the node mstr5 in FIG. 3. The node mstr5 has two children, none of which is a leaf node, implying that the first term (i.e., number of children in the tree, excluding leaf nodes) in equation 1 for this node is two. Furthermore, there are three levels underneath the node mstr 5, implying that the second term (number of levels underneath the node in the tree) in equation 1 for this node is 3.

The third term in equation 1 is "number of similar sub-trees found in the forest". To determine the value of this term for the node mstr5, the sub-tree underneath the node mstr5 is evaluated, in which the nodes underneath the node mstr5 is considered—however, during such consideration, the prefix mstr5 is ignored. For example, the node mstr 5 has a first child and a second child—(i) the first child has one child and (ii) the second child has three more children, and so on. The first child of the node mstr5 is "_r" (i.e., after ignoring the prefix mstr5 from the name of the first child), and the second child of the node mstr5 is "_w". The node_r has a child_rresp, and the node_w has children_wdata, _wid and _wvalid, each of which has corresponding child(ren). In an example, each of the sub-trees underneath the nodes mstr6 and mstr7 also has a structure and node names that are similar to those of the sub-tree underneath the node mstr5. Thus, for the node mstr5, the term "number of similar sub-trees found in the forest" of equation 1 is three (one each for nodes mstr5, mstr6 and mstr7, and assuming that there are no other sub-trees in the forest having similar structure and nomenclature).

Accordingly, the node weight assigned to the node mstr5 is (2×3×3), i.e., 18. Also, assuming that the sub-tree underneath the node mstr (i.e., the top node of the tree 300) is unique in the forest, the node weight assigned to the node mstr is 3×4×1, i.e., 12, which is determined in a similar manner.

Although equation 1 discloses multiplying three terms to determine the node weight for a node, the node weight can be determined in any other appropriate manner as well. As an example, instead of multiplying the three terms, corresponding weighted values of the three terms can be added to determine the node weight for a node.

In an embodiment, the node weights are determined for all the nodes, except for the leaf nodes. Thus, for example, node weights are not determined for the node mstr5_wvalid.

Subsequent to determination of the node weights of the pre-fix tree 300, the following operation is performed. For example, the tree 300 comprises a plurality of pins (e.g., the leaf nodes of the tree 300 correspond to the actual pins), and the tree 300 is a prefix tree (i.e., generated based on the prefix mstr being included in each of the pins). The pins of the prefix tree 300 are also used to generate one or more post-fix trees (e.g., similar to the post-fix tree 400 of FIG. 4). For example, the tree 300 comprises pins mstr5_rresp[0], mstr5_rresp[1], mstr6_rresp[0], mstr6_rresp[1], mstr7_rresp[0] and mstr7_rresp[1] (although some of these pins are not illustrated in FIG. 3 for purposes of simplicity), and these pins are used to generate a post-fix tree. Subsequently, the node weights of each node (except for the leaf nodes) of the post-fix trees are determined. Subsequently, node weights of the nodes in the prefix tree 300 and the node weights of the corresponding post-fix trees are compared. The nodes having the highest node weights are selected.

Once the node weights are determined for nodes of the prefix tree 300 (e.g., the tree 300 of FIG. 3) and the nodes of the corresponding post-fix trees, a node with the highest node weight is selected. For example, as previously discussed herein, the node weight assigned to the node mstr5 in the prefix tree 300 is 18, and the node weight assigned to the node mstr in the prefix tree 300 is 12. Assuming that the node weight assigned to the node mstr5 in the prefix tree 300 is higher than the node weights assigned to the nodes in the corresponding post-fix trees, the node mstr5 is selected. Because (i) the node mstr6 does not fall within the sub-tree beneath the node mstr5 and (ii) the node mstr6 has a node weight that is equal to the node weight of the node mstr5, the node mstr6 is also selected. For similar reasons, the node mstr7 is also selected.

Once a node is selected, in the design of the chip 100, all the pins associated with the selected node is provisionally placed in close proximity (e.g., in a consecutive manner). As an example, the node mstr5 of the tree 300 is selected. As illustrated in FIGS. 2 and 3, the pins mstr5_wdata[0], mstr5_wdata[1], mstr5_wid[0], mstr5_wid[1], mstr5_rresp[0], mstr5_rresp[1] and mstr5_wvalid are associated with the node mstr5. Accordingly, in the design of the chip 100 (e.g., in a relatively early iteration of the design of the chip 100), it is assumed that the pins mstr5_wdata[0], mstr5_wdata[1], mstr5_wid[0], mstr5_wid[1], mstr5_rresp[0], mstr5_rresp[1] and mstr5_wvalid are to be placed in close proximity (e.g., in consecutive locations, with no other pins being placed in between these pins) in the chip 100. Based on such provisional placement of these seven pins, the design (e.g., further iterations of the design) of the chip 100 proceeds. For example, certain space in the chip 100 is reserved for placement of these seven pins associated with the node mstr5.

Similar to the selection of the nodes from the prefix tree 300, one or more nodes from the post-fix tree 400 of FIG. 4 (or from a corresponding prefix tree can also be selected). For example, the nodes of the post-fix tree 400 of FIG. 4 are assigned respective node weights (e.g., using equation 1). Subsequently, one or more prefix trees corresponding to the post-fix tree 400 are generated, based on the pins included in the post-fix tree 400. For example, the tree 400 has pins aRReadyCxbar and aRValidCxbar. A prefix tree is generated using these two pins (e.g., a top node in the prefix tree can be aR*). Subsequently, the nodes of the one or more prefix trees are assigned corresponding node weights. Subsequently, the node weights of the nodes in the post-fix tree 400 and the corresponding one or more prefix trees are compared, to selected one or more nodes. As an example, the node Cxbar from the tree 400 is selected. Once the node Cxbar is selected, in the design of the chip 100, all the pins associated with the selected node Cxbar is provisionally placed in close proximity (e.g., in a consecutive manner).

Figure 6:
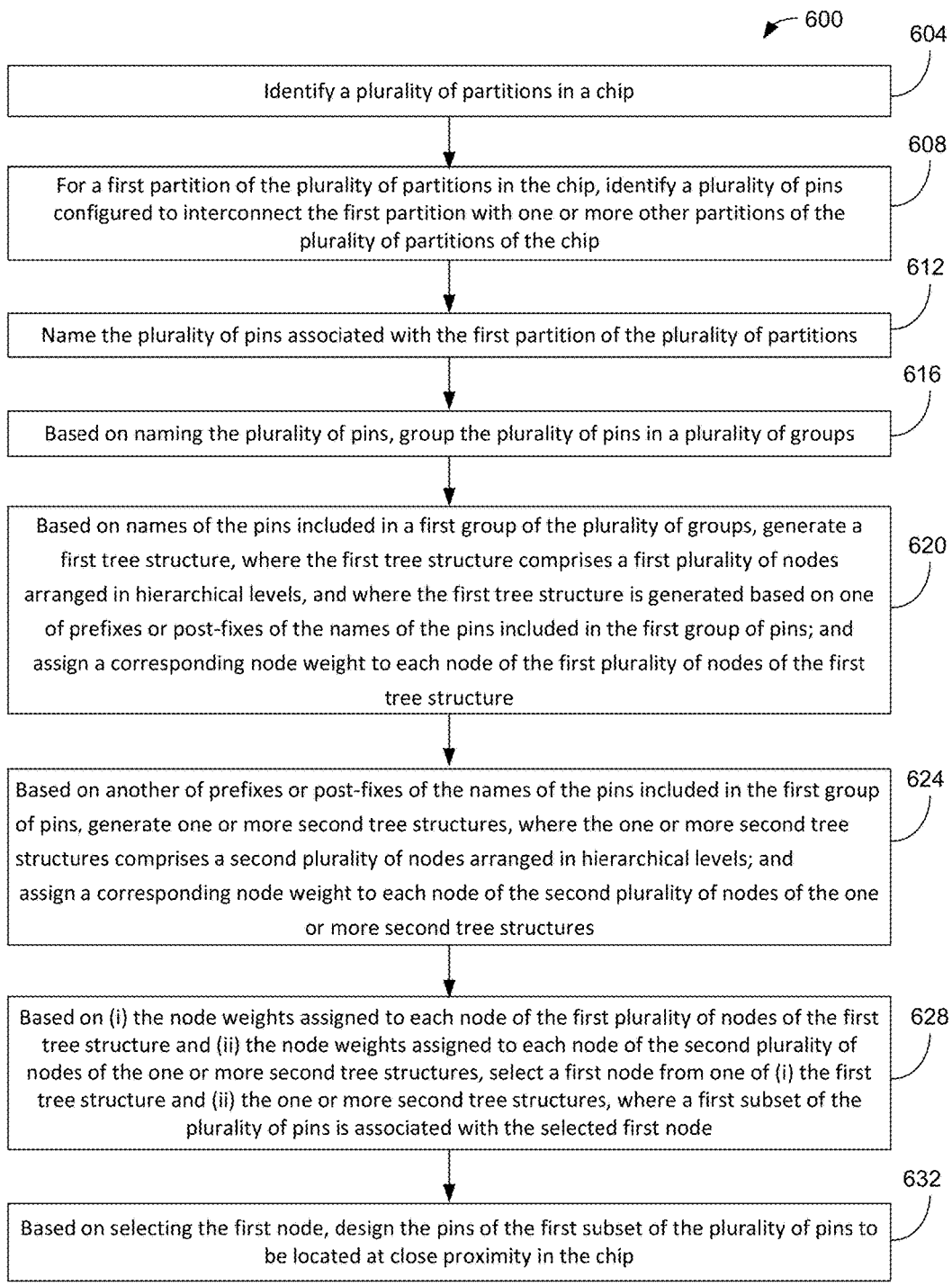
FIG. 6 is a flow diagram of an example method for designing a semiconductor chip.

FIG. 6 is a flow diagram of an example method 600 for designing a chip (e.g., the chip 100 of FIG. 1). The method 600 is performed, for example, while designing the chip. At 604, a plurality of partitions (e.g., partitions 104, . . . , 104h) in a chip is identified. At 608, for a first partition of the plurality of partitions in the chip (e.g., partition 104a), a plurality of pins (e.g., the pins listed in the first column of FIG. 2) for interconnecting the first partition with one or more other partitions of the plurality of partitions of the chip is identified.

At 612, individual pins of the plurality of pins associated with the first partition of the plurality of partitions are named. The naming of a pin is, for example, based on a functionality of the pin, a port in which the pin is to be included, a partition with which the pin is to be associated, a partition to which signals via the pin are to be transmitted, a combination of these factors, and/or the like. In an example, standard naming conventions, protocols or rules are followed while naming the pins.

At 616, based on naming the plurality of pins, the plurality of pins is grouped in a plurality of groups of pins, e.g., as illustrated in FIG. 2. At 620, based on names of the pins included in at least a first group of the plurality of groups, a first tree structure (e.g., the tree structure 300 of FIG. 3) is generated. In an example, the first tree structure comprises a first plurality of nodes arranged in hierarchical levels, where the first tree structure is generated based on one of prefixes or post-fixes of the names of the pins included in the first group of pins. For example, the tree structure 300 of FIG. 3 is generated based on prefixes of the names of the associated pins. Also at 620, a corresponding node weight is assigned to each node of the first plurality of nodes of the first tree structure, e.g., as discussed previously herein with respect to equation 1.

At 624, based on another of prefixes or post-fixes of the names of the pins included in the first group of pins, one or more second tree structures are generated. For example, if the first tree structure is generated based on prefixes, the one or more second tree structures are generated based on post-fixes. In an embodiment, the one or more second tree structures comprise a second plurality of nodes arranged in hierarchical levels. Also at 624, a corresponding node weight is assigned to each node of the second plurality of nodes of the one or more second tree structures.

At 628, based on (i) the node weights assigned to each node of the first plurality of nodes of the first tree structure and (ii) the node weights assigned to each node of the second plurality of nodes of the one or more second tree structures, a first node is selected from one of (i) the first tree structure and (ii) the one or more second tree structures. For example, as discussed with respect to FIG. 3, the node mstr5 is selected. In an example, a first subset of the plurality of pins is associated with the selected first node. For example, the first subset of the plurality of pins is included in a sub-tree underneath the selected first node.

At 632, based on selecting the first node, the pins of the first subset of the plurality of pins is designed to be located at close proximity (e.g., in consecutive location) in the chip.

Second Approach to Pin Groupings and Designing the Chip 100

In the above discussed first approach, the pins in FIG. 2 were grouped in multiple pin groups, and subsequently tree structures were generated corresponding to the multiple pin groups. In the second approach and in an embodiment, the pins are initially arranged in form of tree structures, and subsequently, the pins are grouped in multiple groups, as will be discussed in more detail herein below.

FIG. 7 lists a plurality of pins of the chip 100. The pin names in FIG. 7 correspond to the pin names in the first column of FIG. 2. Assignment of a name to a pin is, for example, based on a functionality of the pin, a port in which the pin is to be included, a partition with which the pin is to be associated, a partition to which signals via the pin are to be transmitted, a combination of these factors, and/or the like, as previously discussed herein.

Figure 8A:
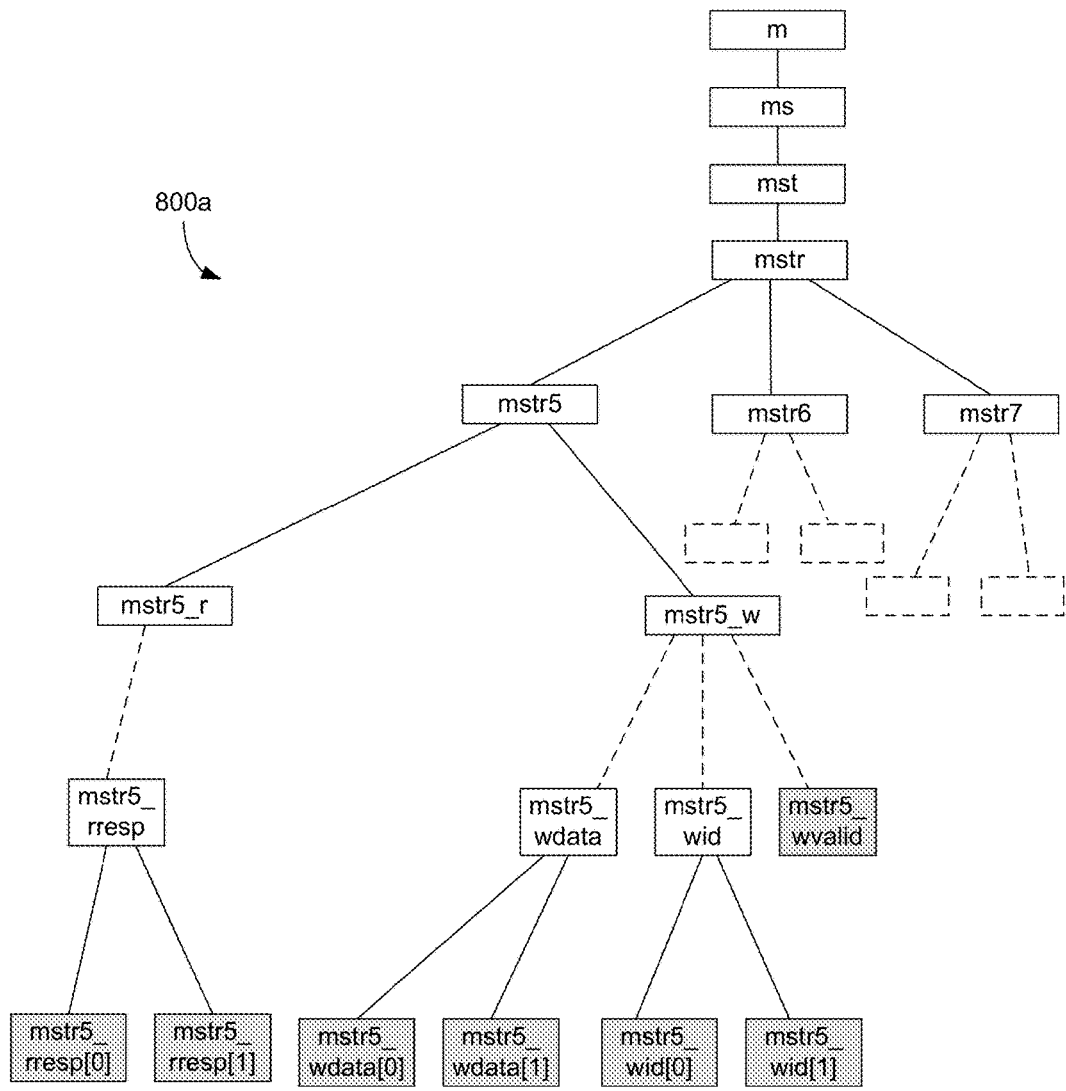
FIGS. 8A-8C illustrate example trees structures, which are formed based on prefixes of various pins.
Figure 8B:
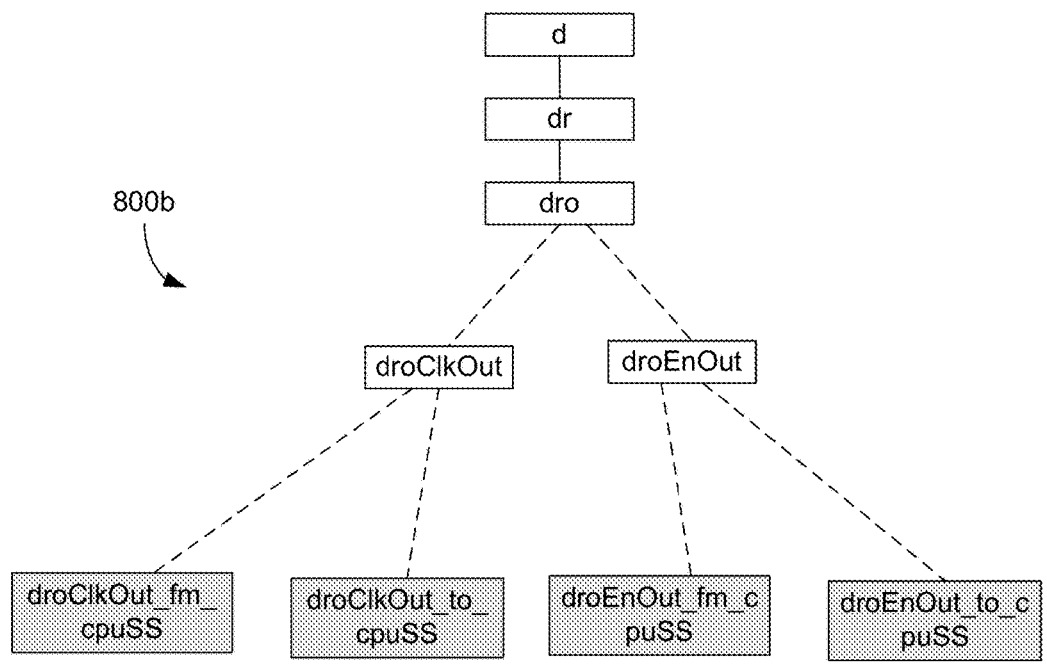
Figure 8C:
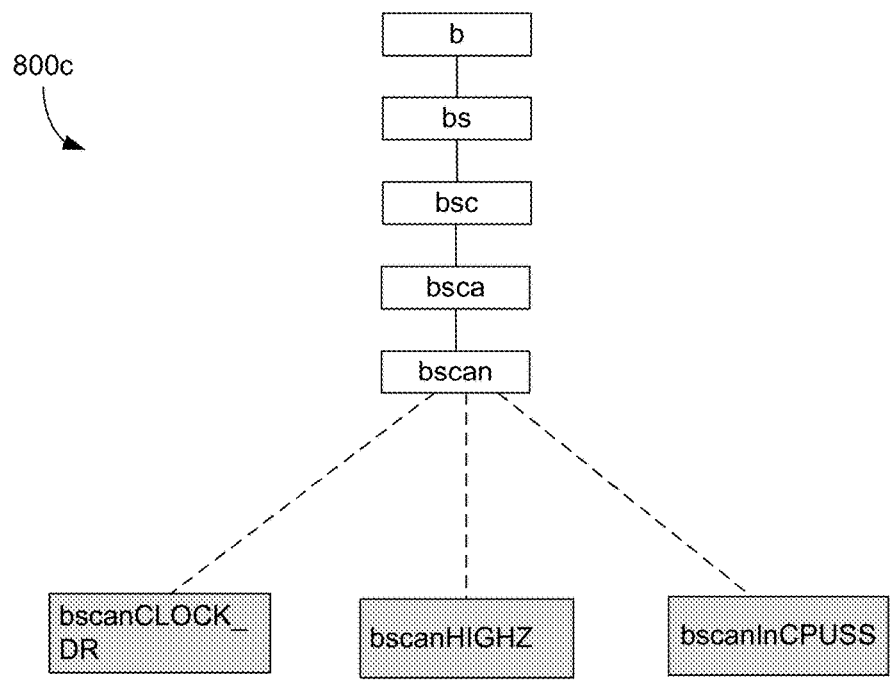

In an embodiment, once the pin names are assigned to the pins, multiple trees are generated based on the pin names. FIGS. 8A-8C illustrate example trees 800a-800c, based on prefixes of various pins. As the trees 800a-800c are based on prefixes of the corresponding pins, the trees 800a-800c are also referred to as prefix trees. Similar to the tree of FIG. 3, the trees 800a-800c have various nodes placed at various hierarchical levels. A parent node of a tree can have one or more children node, one or more grandchildren node, and so on. The parent node is assumed to be at a higher level compared to a child node. Some of the nodes of a tree do not have a corresponding child node—these nodes are referred to herein as "leaf nodes".

Referring to FIG. 8A, the tree 800a includes nodes and pins that start with the alphabet "m." For example, the topmost node of the tree 800a has the alphabet "m." In an embodiment, the nodes in the tree 800a are arranged in an alphabetical order, e.g., to an extent similar to the manner in which words appear in a dictionary. For example, subsequent to forming the topmost node, it is determined whether any pin includes "ma" as a prefix, whether any pin includes "mb" as a prefix, whether any pin includes "mc" as a prefix, and so on. Once it is determined that there are pins that include "ms" as prefix, the second level node is labeled as "ms." This iterative process continues, thereby forming the tree 800a of FIG. 8A.

For the sake of simplicity and in order to not obfuscate the teachings of this disclosure, the children (and grandchildren, and subsequent generation) of the nodes mstr6 and mstr7 are not illustrated in FIG. 8A. That is, sub-trees underneath the nodes mstr6 and mstr7 are not illustrated in FIG. 8A. Only the children (and grandchildren, and subsequent generation) of the node mstr5 (i.e., the sub-tree underneath the node mstr5) are illustrated in FIG. 8A.

Also, in the tree 800a, a node in a given level has one additional alphabet compared to the immediate parent level. For example, the third level node is "mst," while the second level node is "ms." It is to be noted that between the nodes mstr5_r and mstr5_rresp, there are few other nodes, e.g., (i) mstr5_rr, which is child to mstr5_r, (ii) mstr5_rre, which is child to mstr5_rr, and (iii) mstr5_rres, which is child to mstr5_rre. However, for purposes of simplification and illustrative clarity, these nodes are not illustrated in FIG. 8a—instead, the link between the nodes mstr5_r and mstr5_rresp is illustrated using dotted lines to indicate that there are additional nodes present. Similar dotted lines exist between the node mstr5_w and its three children nodes, to indicate presence of nodes not illustrated in FIG. 8A.

The leaf nodes of FIG. 8A are illustrated using dark/grey shades, to indicate that they are leaf nodes. Usually, the leaf nodes correspond to the actual pins of the chip 100. For example, the leaf nodes of the tree 800a are included in the list of pins illustrated in FIG. 7.

Although not illustrated in FIG. 8A, the nodes mstr6 and mstr7 are also expanded in a similar manner to complete the tree 800a.

The trees 800b and 800c of FIGS. 8B and 8C, respectively, are generated in a manner that is at least in part similar to the generation of the tree 800a of FIG. 8A. Accordingly, a more detailed discussion regarding the generation of the trees 800b and 800c is omitted herein. It is to be noted that the prefix trees 800a-800c are mere examples, and various other prefix tress covering various other pins of FIG. 7 are also generated.

Figure 8D:
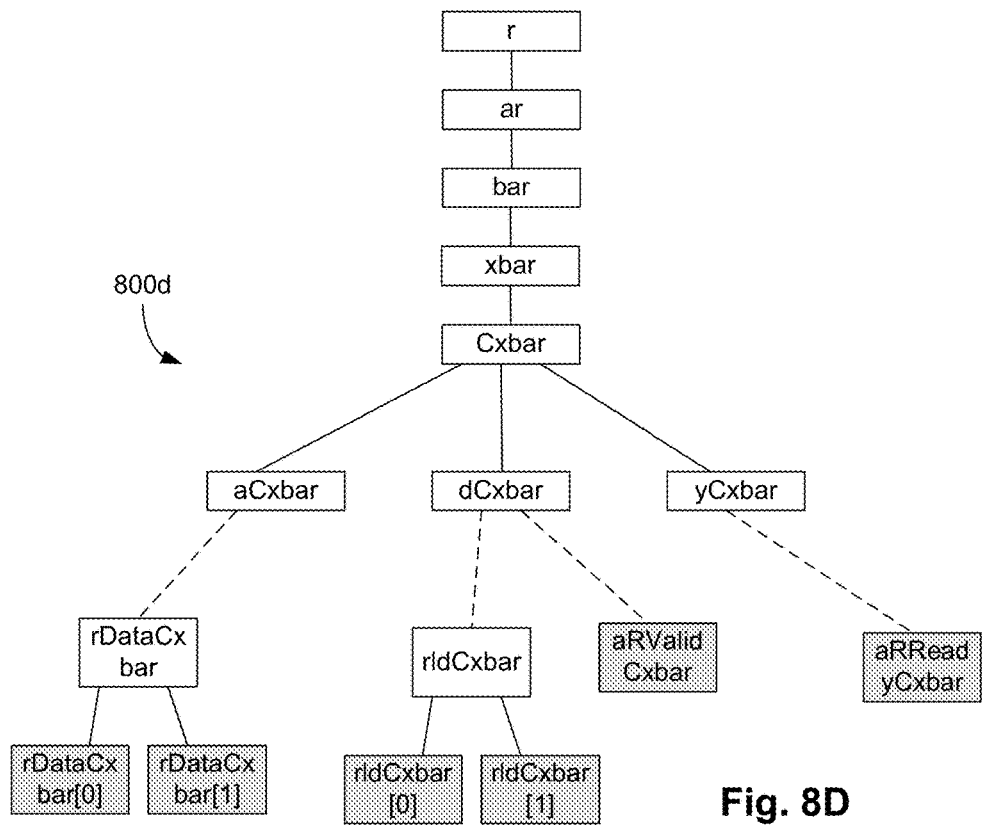
FIGS. 8D-8E illustrate example trees structures, which are formed based on post-fixes of various pins.
Figure 8E:
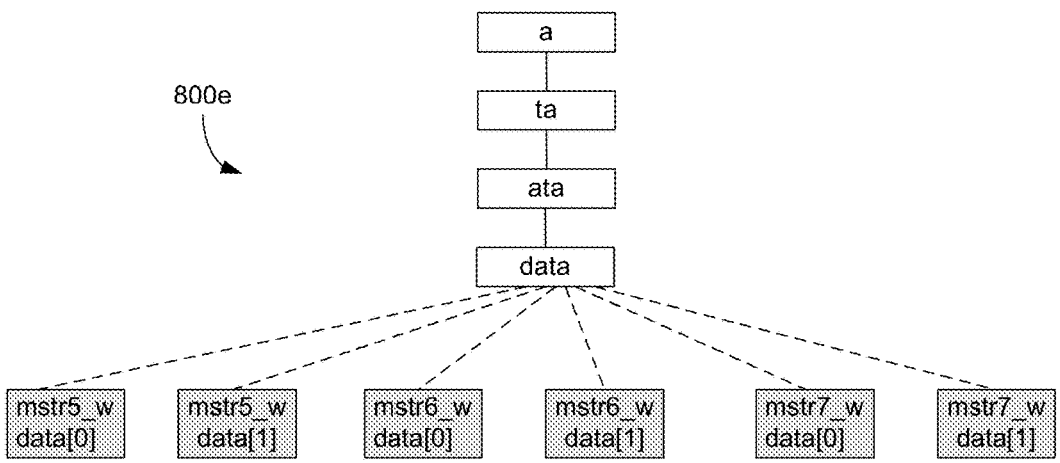

FIGS. 8D-8E illustrate example trees 800d-800e, based on post-fixes of various pins. As the trees 800d-800e are based on post-fixes of the corresponding pins, the trees 800d-800e are also referred to as post-fix trees.

Referring to FIG. 8D, the tree 800d includes nodes and pins that end with the alphabet "r." For example, the topmost node of the tree 900 has the alphabet "r." Subsequent to forming the topmost node, in an embodiment, it is determined whether any pin includes "ar" as a post-fix, whether any pin includes "br" as a post-fix, whether any pin includes "cr" as a post-fix, and so on. Once it is determined that there are pins that include "ar" as a post-fix, the second level node is labeled as "ar." The iterative process continues, thereby forming the tree 800d of FIG. 8D.

In the tree 800d, a node in a given level has one additional alphabet compared to the immediate parent level. For example, the third level node is "bar," while the second level node is "ar."

Some of the nodes of the tree 800d are omitted for purposes of simplicity. For example, the link between the nodes aCxbar and rDataCxbar is illustrated using dotted lines, e.g., to indicate that there are additional nodes present, but not illustrated in the figure. For example, between the nodes aCxbar and rDataCxbar, the nodes not illustrated in FIG. 8D include node taCxbar (which is a child of the node aCxbar), node ataCxbar (which is a child of the node taCxbar), and so on.

The leaf nodes of FIG. 8D are illustrated using dark/grey shades, to indicate that they are leaf nodes. Usually, the leaf nodes correspond to the actual pins of the chip 100. For example, the leaf nodes of the tree 800d are included in the list of pins illustrated in FIG. 7.

The tree 800e of FIG. 8E is generated in a manner that is at least in part similar to the generation of the tree 800d of FIG. 8D. Accordingly, a more detailed discussion regarding the generation of the tree 800e is omitted herein. It is to be noted that the post-fix trees 800d-800e are mere examples, and various other post-fix tress covering various other pins of FIG. 7 are also generated.

Referring to FIGS. 8A and 8E, the pin mstr5_wdata[0] is included in the prefix tree 800a of FIG. 8A and also included in the post-fix tree 800e of FIG. 8E. Thus, a pin can be included in a prefix tree and a post-fix tree (although a pin cannot be included in more than one prefix tree, or be included in more than one post-fix tree).

In an embodiment and as discussed with respect to FIG. 2, there are pins that belong to a miscellaneous category of pins (identified as "misc" in FIG. 2). For example, the pins of the miscellaneous category do not necessarily have other pins with the same prefixes or post-fixes. Thus, a pin of the miscellaneous category may not be included in a prefix tree or a post-fix tree. Most pins, which do not belong to the miscellaneous category, are included in one prefix tree and one post-fix tree. For example, as discussed herein above, the pin mstr5_wdata[0] is included in the prefix tree 800a of FIG. 8A and also included in the post-fix tree 800e of FIG. 8E.

Figure 9A:
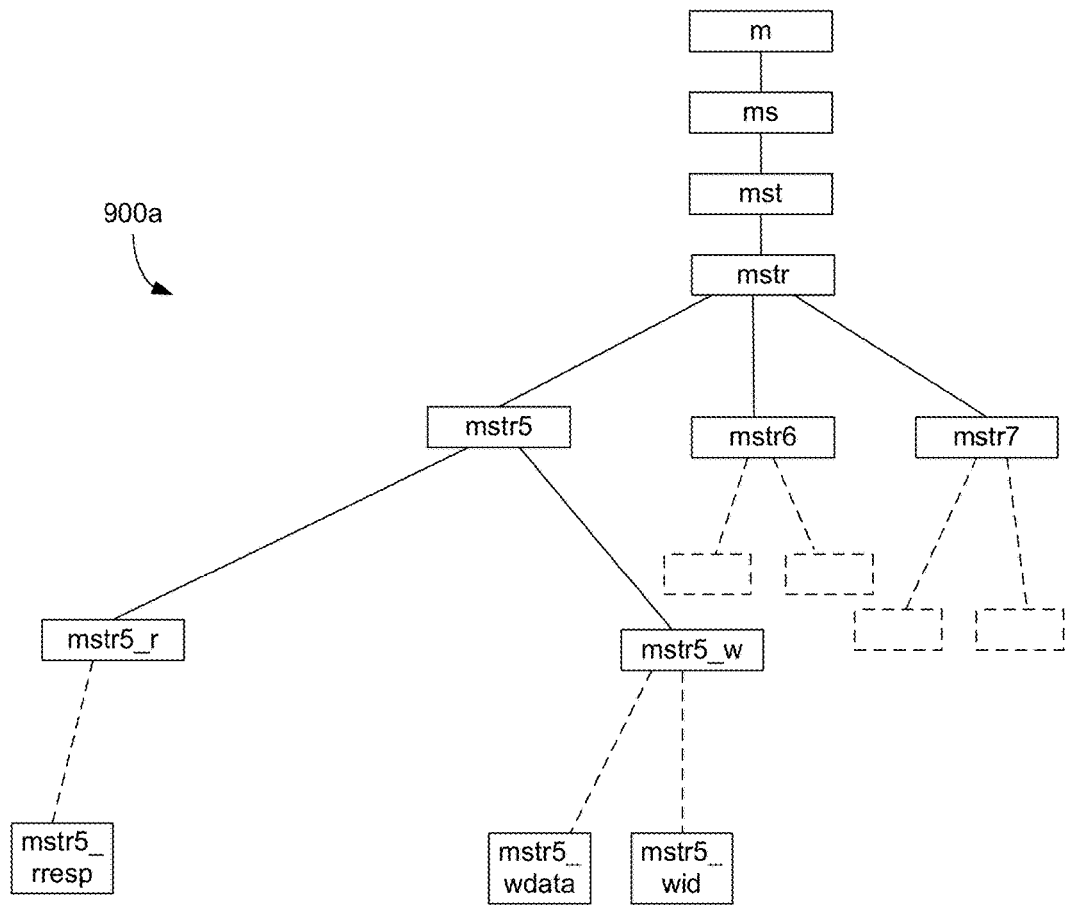
FIGS. 9A-9E illustrate trees structures generated from the trees structures of FIGS. 8A-8E, respectively.
Figure 9B:
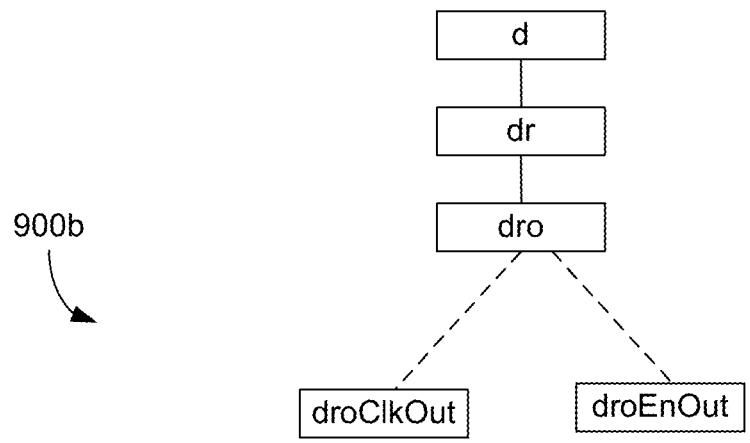
Figure 9C:
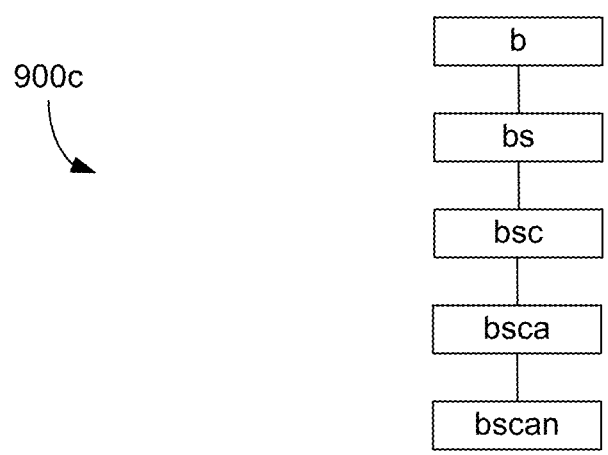

Once the prefix and post-fix trees are generated, the leaf nodes of the prefix and post-fix trees are eliminated or trimmed. For example, FIGS. 9A-9C illustrate prefix trees 900a-900c, respectively, which are respectively generated by eliminating the leaf nodes from the prefix trees 800a-800c of FIGS. 8A-8C, respectively. For example, the tree 900a of FIG. 9A is similar to the tree 800a of FIG. 8A, but with the leaf nodes eliminated from the tree 800a.

Figure 9D:
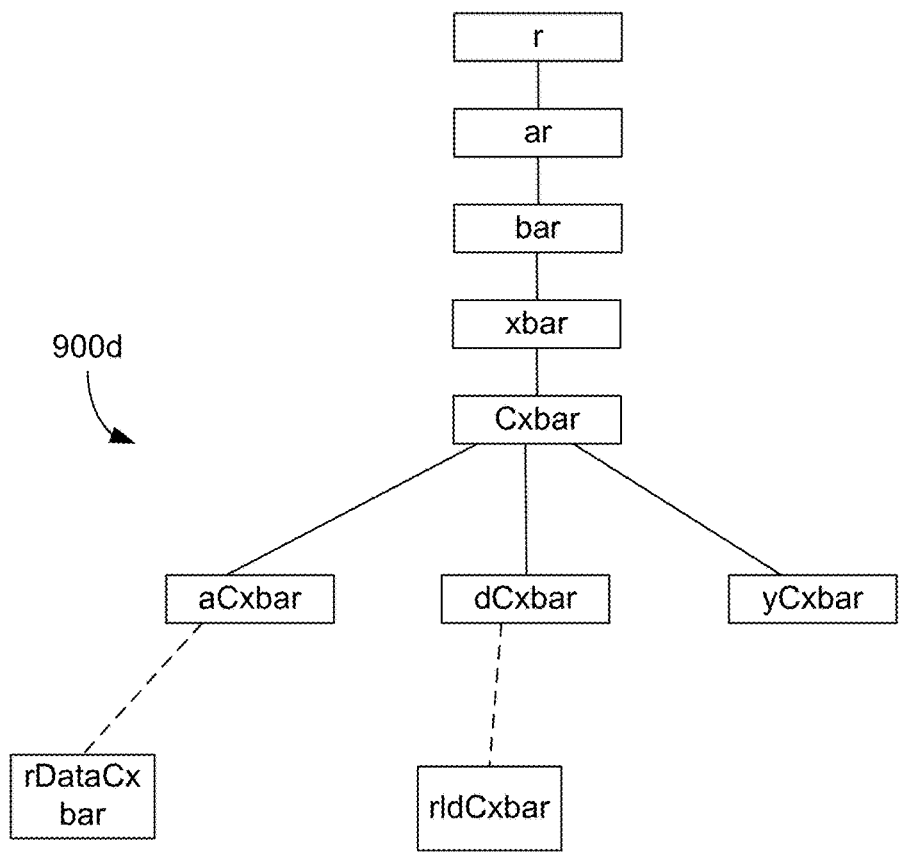
Figure 9E:
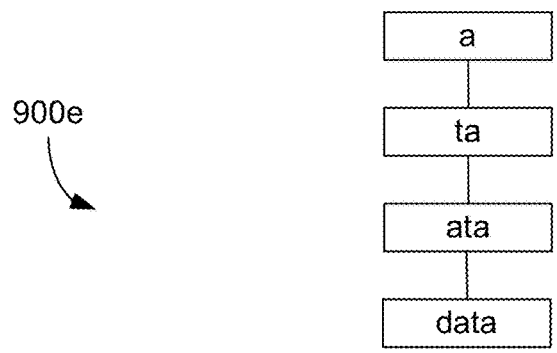

Similarly, FIGS. 9D-9E illustrate post-fix trees 900d-900e, respectively, which are respectively generated by eliminating the leaf nodes from the post-fix trees 800d-800e of FIGS. 8D-8E, respectively. For example, the post-fix tree 900d of FIG. 9D is similar to the post-fix tree 800d of FIG. 8D, but with the leaf nodes eliminated from the post-fix tree 800d.

In an embodiment, only those leaf nodes, which at least have a grand-parent node, is eliminated. Each of the leaf nodes in 8A-8E has a corresponding grand-parent node, and accordingly, the leaf nodes in 8A-8E are eliminated to generate the trees in FIGS. 9A-9E, respectively.

In an embodiment, subsequent to eliminating the leaf nodes, in a tree, an interim parent node is merged with a corresponding child node, if the parent node has only one child node. For example, FIGS. 10A-10E illustrate trees 1000a-1000e, respectively, which are respectively generated from the trees 900a-900e of FIGS. 9A-9E. In the trees 1000a-1000e, individual ones of various parent nodes are merged with a corresponding child node, if the parent node has a single child node.

Figure 10A:
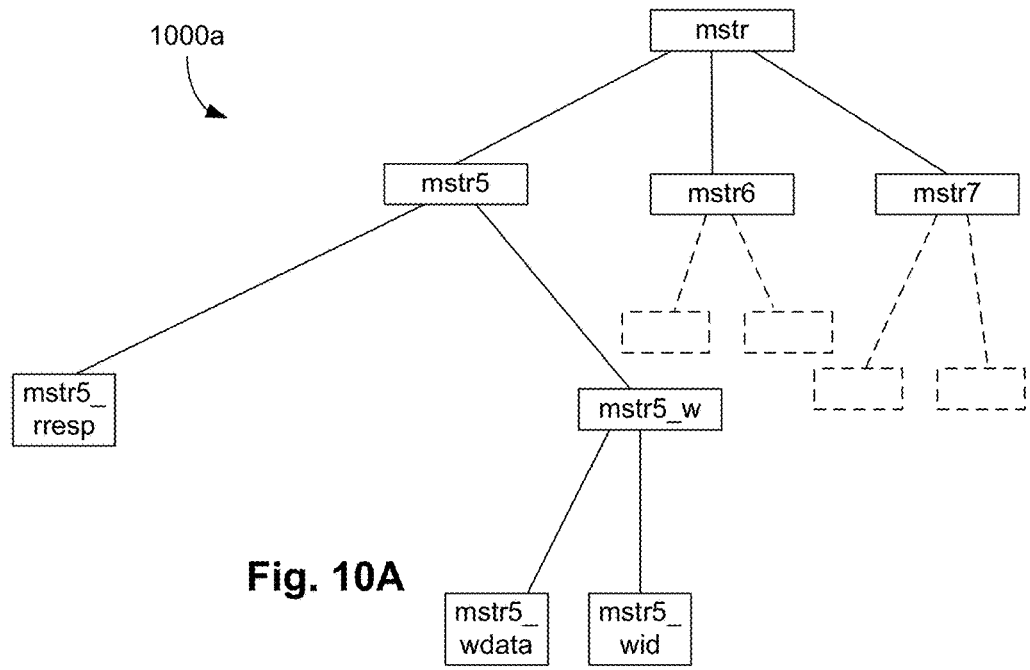
FIGS. 10A-10E illustrate trees structures generated from the trees structures of FIGS. 9A-9E, respectively.

For example, in the tree 900a of FIG. 9A, the node "m" has a single child node ms, which also has a single child node mst, and so on. Accordingly, the node "m" is merged with the corresponding child node ms, which is merged with its single child node mst, and which is again merged with the single child node mstr. Accordingly, the parent, grand-parent and previous generation of the node mstr is merged with the node mstr, as illustrated in FIG. 10A. Thus, in the tree 1000a of FIG. 10a, the node mstr does not have any parent node.

Similarly, the dotted link between the nodes mstr5_r and mstr5_rresp in the tree 900a of FIG. 9A indicates presence of several nodes. However, all these nodes are merged to the node mstr5_rresp, as illustrated in the tree 1000a in FIG. 10A. Accordingly, the link between the nodes mstr5_r and mstr5_rresp in the tree 1000a in FIG. 10A is no longer dotted, as there are no intervening nodes between these two nodes in the tree 1000a.

The trees 1000b-1000e of FIGS. 10B-10E are similarly generated from the trees 900b-900e of FIGS. 9B-9E, respectively. For example, as each node of the tree 900c of FIG. 9C has a single corresponding child node, each node of the tree 900c is merged to a single node bscan in the tree 1000c in FIG. 10C.

Figure 10B:
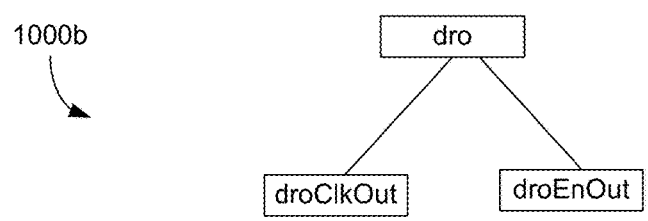
Figure 10C:
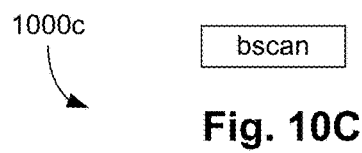
Figure 10D:
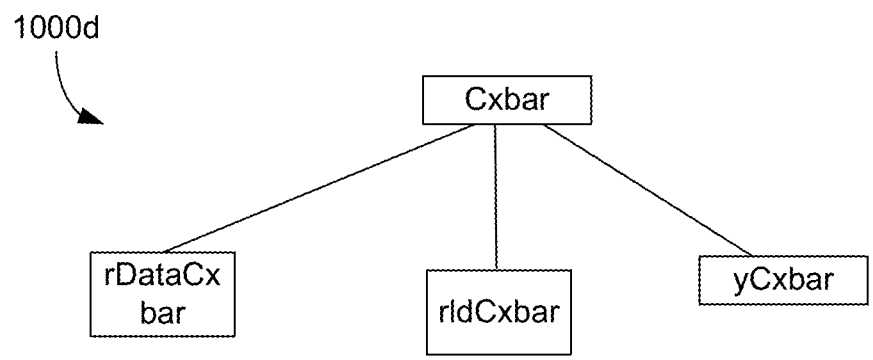
Figure 10E:
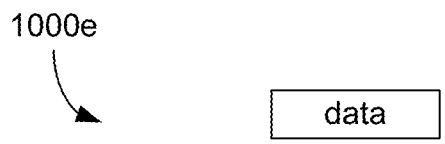

In an embodiment, the selective merging of a parent node to a corresponding child node is performed both for prefix trees (e.g., as illustrated in FIGS. 10A-10C) and post-fix trees (e.g., as illustrated in FIGS. 10D-10E).

In an embodiment, once the parent nodes are selectively merged with corresponding child nodes, a root node (e.g., the top-most node) can represent an abstraction pin group. For example, the root node dro of the tree 1000b of FIG. 10B represents a possible abstraction pin group. In another example, a tree can also represent more than one abstraction pin group. For example, the tree 1000a of FIG. 10A comprises three abstraction pin groups—mstr5, mstr6 and mstr7.

In an embodiment, in order to identify various pin groups associated with a tree, each node of the tree is assigned a node weight. The assignment of node weights have been discussed in detail herein earlier. In an embodiment, the equation 1 previously discussed herein (or a suitable variation of equation 1, as also previously discussed herein) is used to assign node weights to individual nodes of each tree.

It is to be noted that equation 1 has a term (number of children in the tree, excluding leaf nodes). However, in the trees 1000a-1000e of FIGS. 10A-10E, the leaf nodes have already been eliminated (e.g., while generating the trees 900a-900e from the trees 800a-800e). Accordingly, in applying equation 1 to the trees 1000a-1000e of FIGS. 10A-10E, the first term of the equation 1 is modified to be (number of children in the tree). Thus, the node weights of the trees 1000a-1000e of FIGS. 10A-10E are generated using the following equation (or a variation of the following equation, as previously discussed herein):

$$\text{Node weight of a node of a tree} = (\text{number of children in the tree}) \times (\text{number of levels underneath the node in the tree}) \times (\text{number of similar sub-trees found in the forest}) \quad \text{Equation 1a}$$

However, in an alternate embodiment and although not illustrated in the figures, the leaf nodes are not removed from the trees 1000a-1000e, and the original equation 1 is used instead to generate node weights.

As discussed with respect to determining the node weights of various nodes of the tree 300 of FIG. 3, equation 1a is applied to determine the node weights of various nodes of the tree 1000a of FIG. 10A. For example, based on equation 1a, the node weight assigned to the node mstr of the tree 1000a of FIG. 10A is 3*4*1, i.e., 12. Similarly, based on equation 1a, the node weight assigned to the node mstr5 of the tree 1000a of FIG. 10A is 2*3*3, i.e., 18. Similarly, each of the nodes mstr6 and mstr7 of the tree 1000a of FIG. 10A is also assigned the same node weight of 18. Accordingly, as the node weights assigned to the nodes mstr5, mstr6 and mstr7 are equal and are highest among all the node weights assigned to all the nodes of the tree 1000a, the nodes mstr5, mstr6 and mstr7 are selected to represent abstract pin groups for the tree 1000a.

Similarly, in an embodiment, the nodes dro, bscan, Cxbar and data of the trees 1000b-1000e, respectively, are selected to represent abstract pin groups of the respective trees.

Thus, multiple abstract pin groups, associated with various trees, are formed, where each abstract pin groups has a corresponding root node. For example, as discussed, the nodes mstr5, mstr6, mstr7, dro, bscan, Cxbar and data of the trees 1000a-1000e form corresponding abstract pin groups.

In an embodiment, each abstract pin group has a corresponding intrinsic pin coverage. For example, as illustrated in FIG. 8A, the abstract pin group mstr5 covers pins mstr5_wdata[0], mstr5_wdata[1], mstr5_wid[0], mstr5_wid[1], mstr5_rresp[0], mstr5_rresp[1] and mstr5_wvalid. In another example and as illustrated in FIG. 8B, the abstract pin group dro covers pins droClkOut_fm_cpuSS, droClkOut_to_cpuSS, droEnOut_fm_cpuSS and droEnOut_to_cpuSS. In an embodiment, a number of pins covered by an abstract pin group is referred to as an intrinsic coverage of the abstract pin group. For example, as the abstract pin group mstr5 covers pins mstr5_wdata[0], mstr5_wdata[1], mstr5_wid[0], mstr5_wid[1], mstr5_rresp[0], mstr5_rresp[1] and mstr5_wvalid, the intrinsic coverage of the abstract pin group mstr5 is seven. In another example, as the abstract pin group dro covers pins droClkOut_fm_cpuSS, droClkOut_to_cpuSS, droEnOut_fm_cpuSS and droEnOut_to_cpuSS, the intrinsic coverage of the abstract pin group dro is four.

In an embodiment, each abstract pin group is classified as a prefix abstract pin group or a post-fix abstract pin group, based on a tree from which the abstract pin group is derived. Accordingly, the abstract pin groups mstr5, mstr6, mstr7, dro and bscan from the trees 1000a-1000c are classified as prefix abstract pin groups, and the abstract pin groups Cxbar and data from the trees 1000d-1000e are classified as post-fix abstract pin groups.

Assume a scenario where there are N number of prefix abstract pin groups, and M number of post-fix abstract pin groups. Also assume that the N number of prefix abstract pin groups, when ordered in a descending order of corresponding intrinsic coverage, is represented by Pa, Pb, . . . , PN. That is, the prefix abstract pin group Pa has higher intrinsic coverage than the prefix abstract pin group Pb, the prefix abstract pin group Pb has higher intrinsic coverage than the prefix abstract pin group Pc, and so on.

Also assume that the M number of post-fix abstract pin groups, when ordered in a descending order of corresponding intrinsic coverage, is represented by P'a, P'b, . . . , P'M. That is, the post-fix abstract pin group P'a has higher intrinsic coverage than the post-fix abstract pin group P'b, the post-fix abstract pin group P'b has higher intrinsic coverage than the post-fix abstract pin group P'c, and so on. Table 1 below illustrates example intrinsic coverage of the abstract pin groups. It is to be noted that the number of the pin groups and the corresponding intrinsic coverage are mere examples

TABLE 1

| Group type | Group name | Intrinsic coverage |
|---|---|---|
| Prefix abstract pin group | Pa | 45 |
| Prefix abstract pin group | Pb | 40 |
| Prefix abstract pin group | Pc | 38 |
| . . . | . . . | . . . |

TABLE 1-continued

| Group type | Group name | Intrinsic coverage |
|---|---|---|
| Prefix abstract pin group | PN | 4 |
| Post-fix abstract pin group | P'a | 39 |
| Post-fix abstract pin group | P'b | 25 |
| Post-fix abstract pin group | P'c | 20 |
| . . . | . . . | . . . |
| Post-fix abstract pin group | P'M | 2 |

In an embodiment, it is determined whether the prefix abstract pin groups or the post-fix abstract pin groups are dominant. In an embodiment, the numbers N and M are compared. If N is less than M, then a forest comprising the trees associated with the chip 100 is assumed to be prefix abstract pin group dominated; and if M is less than N, then the forest comprising the trees associated with the chip 100 is assumed to be post-fix abstract pin group dominated.

In an embodiment, a table, e.g., table 2 below, is generated from table 1. A first or topmost entry of the table 2 comprises an abstract pin group from the dominating pin groups. For example, assume that N is less than M, and the forest comprising the trees associated with the chip 100 is prefix abstract pin group dominated. Accordingly, the first or topmost entry of the table 2 comprises a prefix abstract pin group with highest intrinsic coverage among all the prefix abstract pin groups, which is the prefix abstract pin group Pa, as seen in table 1.

The other entries of the table 2 are the abstract pin groups arranged in a descending order of intrinsic coverage. For example, the prefix pin group Pb has an intrinsic coverage of 40, and occupies the second row of the table 2, followed by the post-fix pin group P'a with an intrinsic coverage of 39, and so on.

In an embodiment, the table 2 also comprises a fourth column that keeps track of cumulative intrinsic coverage of the pins. For example, the cumulative intrinsic coverage corresponding to the first row of the table 2 is 45, which is equal to the intrinsic coverage of the pin group Pa. The cumulative intrinsic coverage corresponding to the second row of the table 2, for example, is 85, which is equal to a sum of (i) the cumulative intrinsic coverage of row 1 and (i) the cumulative intrinsic coverage of the pin group Pb. The cumulative intrinsic coverage of various other rows of the table are similarly determined.

TABLE 2

| Row number | Group name | Intrinsic coverage | Comment | Cumulative intrinsic coverage |
|---|---|---|---|---|
| 1 | Pa | 45 | Pa is selected, as the forest is prefix dominated | 45 |
| 2 | Pb | 40 | | 85 |
| 3 | P'a | 39 | | 124 |
| 4 | Pc | 38 | | 162 |
| 5 | P'b | 25 | Ignore, as pin group P'b has overlapping coverage with one or more pin groups of the rows 1, . . . , 4 | 162 |
| 6 | P'c | 20 | | 182 |
| 7 | Pd | 19 | Stop, as the cumulative intrinsic coverage has reached the total unique pin count of 199 | 199 |
| 8 | P'd | 18 | Ignore | |
| . . . | . . . | . . . | . . . | |
| (N + M − 1) | PN | 4 | Ignore | |
| (N + M) | P'M | 2 | Ignore | |

As previously discussed, a pin (except, for example, the pins categorized as miscellaneous pins) is included in one prefix tree and one post-fix tree. For example, the pin mstr5_wdata[0] is included in the prefix tree 800*a* and the post-fix tree 800*e*. Accordingly, the pin mstr5_wdata[0] is included in the intrinsic coverage of the abstract pin group mstr5, and also included in the intrinsic coverage of the abstract pin group data.

In the table 2, starting from the top, it is determined if a pin group has overlapping pin with a pin group that is higher up in the table. For example, for the pin group Pb in the second row of the table 2, it is determined if the pin group Pb has any overlapping pin with the pin group Pa. If not, the pin group Pb is not ignored. In another example, for the pin group P'a in the third row of the table 2, it is determined if the pin group P'a has any overlapping pin with the pin groups Pa and Pb.

As illustrated in the table 2, is it determined that the pin group P'b in the fifth row of the table 2 has one or more overlapping pins with one or more of the pin groups Pa, Pb, P'a and Pc. Based upon such determination, the pin group P'b is ignored, and the cumulative intrinsic coverage corresponding to the pin group P'b is not updated.

Also, a total number of "unique" pins covered by all the pin groups Pa, . . . , PN, P'a, . . . , P'M is determined. For example, if a pin (e.g., the pin mstr5_wdata[0]) is covered by two pin groups (e.g., the prefix tree 800*a* and the post-fix tree 800*e*), the pin is considered only once while determining the total number of unique pins covered by all the pin groups of table 2. Assume, merely as an example, that the total number of unique pins covered by all the pin groups of table 1 is 199 (although, in a real SOC, the number can be much higher, and run in even thousands).

The cumulative intrinsic coverage of various pin groups in table 2 is updated (e.g., starting from the top, and descending downwards), until the cumulative intrinsic coverage reaches the total number of unique pins covered by all the pin groups of table 1. For example, the cumulative intrinsic coverage of the pin group Pd in the seventh row reaches the total number of unique pins covered by all the pin groups of table 1. Accordingly, the cumulative intrinsic coverage of the pin groups in row eight and downwards are not updated.

Subsequently, the pin groups, which are not ignored in the table 2 and for which the cumulative intrinsic coverage are updated, are selected. For example, pin groups Pa, Pb, P'a, Pc, P'c and Pd are selected. It is to be noted that the pin group P'b is ignored in table 2, and hence, not selected. Also, the cumulative intrinsic coverage of pin groups P'd, . . . , PN and PM are not updated, and accordingly, these pins are not selected.

Once an abstract pin group is selected, in the design of the chip 100, all the pins associated with the selected abstract pin group is provisionally placed in close proximity (e.g., in a consecutive manner). As an example, assume that the abstract pin group mstr5 of the tree 1000*a* is selected. As illustrated in FIG. 8*a*, the pins mstr5_wdata[0], mstr5_wdata[1], mstr5_wid[0], mstr5_wid[1], mstr5_rresp[0], mstr5_rresp[1] and mstr5_wvalid are associated with the abstract pin group mstr5. Accordingly, in the design of the chip 100 (e.g., in a relatively early iteration of the design of the chip 100), it is assumed that the pins mstr5_wdata[0], mstr5_wdata[1], mstr5_wid[0], mstr5_wid[1], mstr5_rresp[0], mstr5_rresp[1] and mstr5_wvalid are to be placed in close proximity (e.g., in consecutive locations, with no other pins being placed in between these pins) in the chip 100. Based on such provisional placement of these seven pins, the design (e.g., further iterations of the design) of the chip 100 proceeds. For example, certain space in the chip 100 is reserved for placement of these seven pins associated with the node mstr5.

Figure 11:
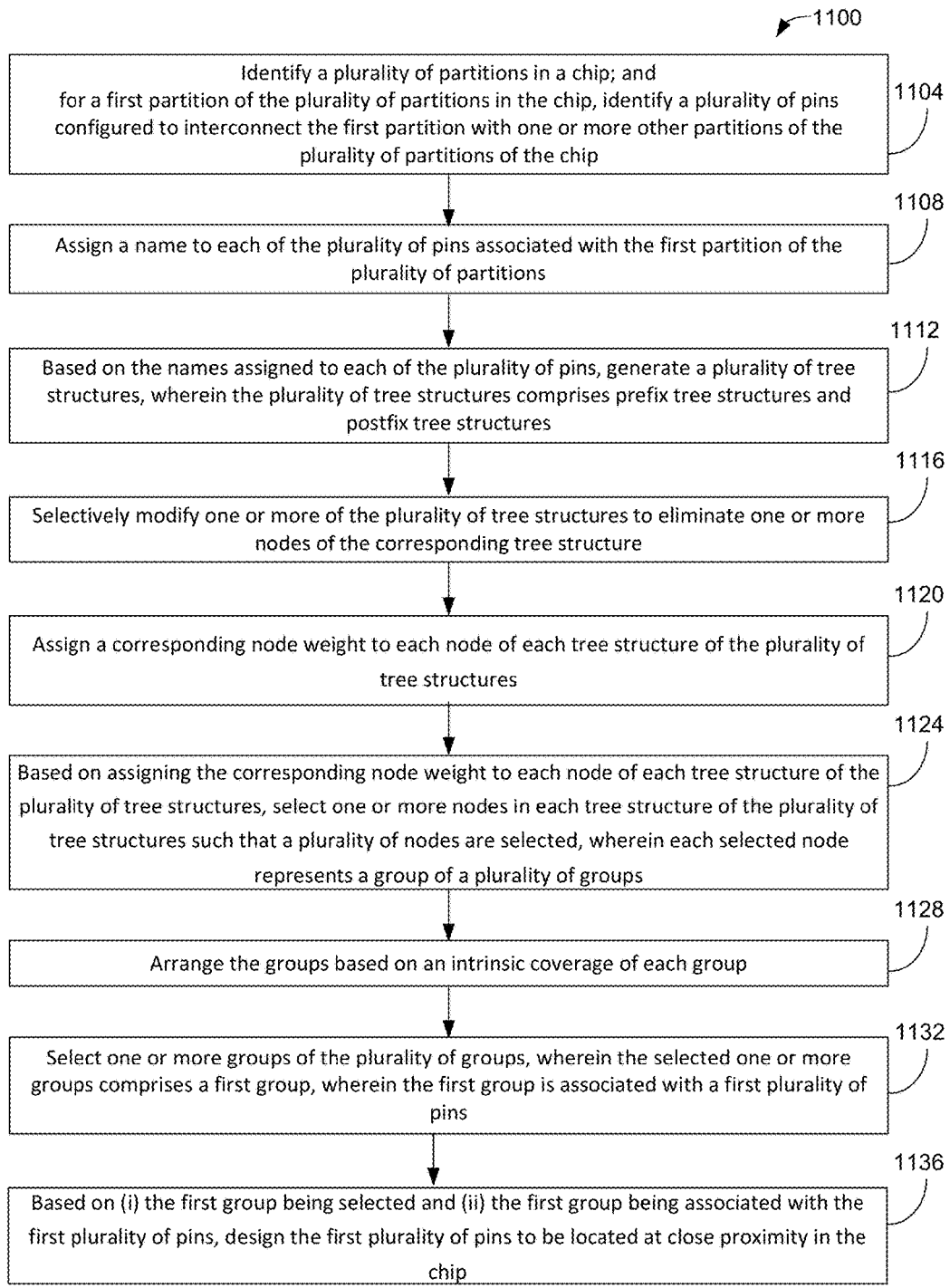
FIG. 11 is a flow diagram of another example method for designing a semiconductor chip.

FIG. 11 is a flow diagram of an example method 1100 for designing a chip (e.g., the chip 100 of FIG. 1). The method 1100 is performed, for example, while designing the chip. At 1104, a plurality of partitions (e.g., partitions 104, . . . , 104*h*) in a chip is identified. Also at 1104, for a first partition of the plurality of partitions in the chip (e.g., partition 104*a*), a plurality of pins (e.g., the pins listed in FIG. 7) for interconnecting the first partition with one or more other partitions of the plurality of partitions of the chip is identified.

At 1108, individual pins of the plurality of pins associated with the first partition of the plurality of partitions are assigned respective names. The naming of a pin is, for example, based on a functionality of the pin, a port in which the pin is to be included, a partition with which the pin is to be associated, a partition to which signals via the pin are to be transmitted, a combination of these factors, and/or the like. In an example, standard naming conventions, protocols or rules are followed while naming the pins.

At 1112, based on the names assigned to each of the plurality of pins, a plurality of tree structures is generated, where the plurality of tree structures comprises prefix tree structures (e.g., generated based on prefixes of the names of the associated pins) and post-fix tree structures (e.g., generated based on post-fixes of the names of the associated pins). For example, trees 800*a*-800*e* of FIGS. 8A-8E are generated, where the trees 800*a*-800*c* are prefix trees, and the trees 800*d*-800*e* are post-fix trees.

At 1116, one or more of the plurality of tree structures are selectively modified to eliminate one or more nodes of the corresponding tree structure. For example, various nodes of the trees 800*a*-800*e* are eliminated to generate the trees 1000*a*-1000*e*, respectively.

At 1120, subsequent to modifying the tree structures, a corresponding node weight is assigned to each node of each tree structure of the plurality of tree structures. Such assignment of the node weights, for example, is in accordance with equation 1a (or a variation of the equation).

At 1124, based on assigning the corresponding node weight to each node of each tree structure of the plurality of tree structures, one or more nodes in each tree structure of the plurality of tree structures is selected such that a plurality of nodes are selected. In an embodiment, each selected node represents a group of a plurality of groups. For example, as discussed with respect to FIGS. 10A-10E, nodes mstr5, mstr6, mstr7, dro, bscan, Cxbar and data of the trees 1000*a*-1000*e* are selected, and forms corresponding abstract groups.

At 1128, the groups are arranged based on an intrinsic coverage of each group. Such arrangement, for example, is discussed with respect to tables 1 and 2.

At 1132, based on arranging the groups, one or more groups of the plurality of groups are selected. In an example, the selected one or more groups comprises a first group, where the first group is associated with a first plurality of pins.

At 1136, based on (i) the first group being selected and (ii) the first group being associated with the first plurality of pins, the first plurality of pins are designed to be located at close proximity in the chip.

CONCLUSION

In an embodiment, grouping the pins based on pin names, designing pins of the chip 100 based on such groupings, as discussed in this disclosure and as also discussed in FIGS. 6 and 11, have several advantages. For example, such placement of the pins in the chip design acts as a place holder for the pins. In an example, even if the design of the partitions are changed in successive iteration of the design, individual functionality and/or location of the pins can change, but the overall location of the pins may not drastically change. Accordingly, the pins do not need to be fully re-designed during such design iteration, thereby reducing an overall time in designing the chip.

In an embodiment, the design of the chip 100 (e.g., one or more operations associated with the methods 600 and 1100 of FIGS. 6 and 11) is performed in one or more computing devices that run appropriate design algorithms. For example, one or more computing devices suitable for designing a chip is employed to design the chip 100, where the one or more computing devices comprises one or more processors, and non-transitory computer-readable storage media (e.g., memory). In an example, instructions are tangibly stored on the computer-readable storage media, where the instructions are executable by the one or more processors to enable the processors to execute algorithms and operations for designing the chip 100.

A semiconductor chip, as referred to in this disclosure, refers to a semiconductor die, a micro-electronic component, or the like. Although some of the embodiments of this disclosure are discussed with respect to designing a chip, the teachings of this disclosure can be applied to designing any other appropriate component as well, e.g., a circuit, a semiconductor package, a micro-electronic device, etc.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A computer-implemented method comprising:
   executing, by one or more processors of a computing device, one or more computing processes for designing a chip, wherein the one or more computing processes comprise:
      identifying, by the one or more processors, a plurality of partitions in the chip,
      for a first partition of the plurality of partitions in the chip, identifying, by the one or more processors, a plurality of pins configured to interconnect the first partition with one or more other partitions of the plurality of partitions of the chip,
      assigning, by the one or more processors, a name to each of the plurality of pins associated with the first partition of the plurality of partitions,
      based on the names assigned to each of the plurality of pins, generating, by the one or more processors, a plurality of tree structures, wherein each of the plurality of tree structures comprises a corresponding plurality of nodes arranged in hierarchical levels;
      based on the plurality of tree structures, forming, by the one or more processors, a plurality of groups such that each group of the plurality of groups is associated with a corresponding one or more pins of the plurality of pins, and
      based on forming the plurality of groups, generating, by the one or more processors, a provisional pin layout for the chip, the provisional pin layout indicating that a first subset of the plurality of pins as being located at close proximity in the chip;
      wherein at least one process of the one or more computing processes for designing the chip utilizes the provisional pin layout.

2. The computer-implemented method of claim 1, further comprising:
   selectively modifying one or more of the plurality of tree structures to eliminate one or more nodes of the corresponding tree structure; and
   subsequent to selectively modifying the one or more of the plurality of tree structures, assigning a corresponding node weight to individual nodes of each tree structure of the plurality of tree structures.

3. The computer-implemented method of claim 2, wherein a leaf node in a tree structure is a node that does not have a child node in the tree structure, and wherein selectively modifying the one or more of the plurality of tree structures comprises:
   for a first tree structure, identifying a plurality of leaf nodes; and
   modifying the first tree structure by eliminating the plurality of leaf nodes of the first tree structure.

4. The computer-implemented method of claim 2, wherein selectively modifying the one or more of the plurality of tree structures comprises:
   for a first tree structure, identifying a first node that has a single child node in the first tree structure; and
   based on the first node having the single child node in the first tree structure, modifying the first tree structure to eliminate the first node by merging the first node to the corresponding child node.

5. The computer-implemented method of claim 2, wherein assigning the corresponding node weight to individual nodes of each tree structure of the plurality of tree structures comprises:
   based on (i) a number of children of a first node in a first tree structure and (ii) a number of hierarchical levels underneath the first node in the first tree structure, assigning a first node weight to the first node.

6. The computer-implemented method of claim 5, wherein assigning the corresponding node weight to individual nodes of each tree structure of the plurality of tree structures comprises:
   identifying a sub-tree structure underneath the first node;
   identifying whether the sub-tree structure underneath the first node is at least in part similar to one or other sub-tree structures in the plurality of tree structures; and
   based on identifying whether the sub-tree structure underneath the first node is at least in part similar to one or other sub-tree structures in the plurality of tree structures, assigning the first node weight to the first node.

7. The computer-implemented method of claim 2, further comprising:
based on assigning the corresponding node weight to individual nodes of each tree structure of the plurality of tree structures, selecting one or more nodes in each tree structure of the plurality of tree structures such that a plurality of nodes are selected,
wherein forming the plurality of groups comprises
based on selecting the plurality of nodes, forming the plurality of groups such that each group of the plurality of groups corresponds to a respective one of the selected plurality of nodes.

8. The computer-implemented method of claim 2, wherein generating the plurality of tree structures comprises:
based on a first two or more pins of the plurality of pins having a same prefix in their respective names, generating a first tree structure comprising the first two or more pins having the same prefix in their respective names.

9. The computer-implemented method of claim 8, wherein generating the plurality of tree structures comprises:
based on a second two or more pins of the plurality of pins having a same post-fix in their respective names, generating a second tree structure comprising the second two or more pins having the same post-fix in their respective names.

10. The computer-implemented method of claim 1, further comprising:
based on forming the plurality of groups, selecting one or more groups of the plurality of groups, wherein the first subset of the plurality of pins are included in a first group of the selected one or more groups,
wherein generating the provisional pin layout for the chip further comprises
based on (i) selecting the first group of the plurality of groups and (ii) the first subset of the plurality of pins being included in the first group, designing the first subset of the plurality of pins to be located at close proximity.

11. The computer-implemented method of claim 10, wherein each group of the plurality of groups is associated with a corresponding intrinsic coverage that represents a number of pins covered by the group, wherein selecting the one or more groups of the plurality of groups further comprises:
arranging the plurality of groups based on a descending order of the corresponding intrinsic coverage of each group; and
based on arranging the plurality of groups, selecting the one or more groups of the plurality of groups.

12. The computer-implemented method of claim 11, wherein arranging the plurality of groups comprises:
determining that a first group includes one or more pins that are also included in another group that has a higher intrinsic coverage than the intrinsic coverage of the first group; and
based on determining that the first group includes the one or more pins that are also included in the another group that has the higher intrinsic coverage than the intrinsic coverage of the first group, ignoring the first group while arranging the plurality of groups.

13. The computer-implemented method of claim 11, wherein each of the one or more groups of the plurality of groups has higher intrinsic coverage compared to other groups of the plurality of groups, and wherein selecting the one or more groups of the plurality of groups further comprises:
based on each of the one or more groups of the plurality of groups having higher intrinsic coverage compared to the other groups of the plurality of groups, selecting the one or more groups of the plurality of groups.

14. The computer-implemented method of claim 11, wherein the selected one or more groups of the plurality of group, in combination, (i) covers each unique pin associated with the plurality of groups, and (ii) does not have a duplication of any pin.

15. The computer-implemented method of claim 1, wherein assigning the corresponding name to each of the plurality of pins comprises:
based on one or both of (i) a functionality of ones of the plurality of pins and (ii) a destination of signals transmitted via ones of the plurality of pins, assigning the corresponding name to each of the plurality of pins.

16. The computer-implemented method of claim 1, wherein generating the provisional pin layout for the chip further comprises:
designing the first subset of the plurality of pins to be located at close proximity such that the pins of the first subset of the plurality of pins are consecutively located in the design of the chip.

17. An apparatus for designing a chip, the apparatus comprising:
one or more processors; and
a non-transitory computer-readable storage media, wherein instructions are tangibly stored on the computer-readable storage media, wherein the instructions are executable by the one or more processors to enable the one or more processors to execute one or more computing process for designing a chip wherein the one or more computing processes comprise:
identifying a plurality of partitions in the chip,
for a first partition of the plurality of partitions in the chip, identifying a plurality of pins configured to interconnect the first partition with one or more other partitions of the plurality of partitions of the chip,
assigning a name to each of the plurality of pins associated with the first partition of the plurality of partitions,
based on the names assigned to each of the plurality of pins, generating a plurality of tree structures, wherein each of the plurality of tree structures comprises a corresponding plurality of nodes arranged in hierarchical levels;
based on the plurality of tree structures, forming a plurality of groups such that each group of the plurality of groups is associated with a corresponding one or more pins of the plurality of pins, and
based on forming the plurality of groups, generating, by the one or more processors, a provisional pin layout for the chip, the provisional pin layout indicating that the plurality of pins as being located at close proximity in the chip;
wherein at least one process of the one or more computing processes for designing the chip utilizes the provisional pin layout.

18. The apparatus of claim 17, wherein the one or more computing processes further comprise:
selectively modifying one or more of the plurality of tree structures to eliminate one or more nodes of the corresponding tree structure; and subsequent to selectively modifying the one or more of the plurality of tree structures, assigning a corresponding node weight to individual nodes of each tree structure of the plurality of tree structures.

19. The apparatus of claim 17, wherein the one or more computing processes further comprise:
based on assigning the corresponding node weight to individual nodes of each tree structure of the plurality of tree structures, selecting one or more nodes in each tree structure of the plurality of tree structures such that a plurality of nodes are selected,
wherein forming the plurality of groups comprises
based on selecting the plurality of nodes, forming the plurality of groups such that each group of the plurality of groups corresponds to a respective one of the selected plurality of nodes.

20. The apparatus of claim 17, wherein the one or more computing processes further comprise:
based on forming the plurality of groups, selecting one or more groups of the plurality of groups, wherein the first subset of the plurality of pins are included in a first group of the selected one or more groups,
wherein generating the provisional pin layout for the chip further comprises
based on (i) selecting the first group of the plurality of groups and (ii) the first subset of the plurality of pins being included in the first group, designing the first subset of the plurality of pins to be located at close proximity.

* * * * *